United States Patent

[11] 3,590,154

[72] Inventor Anthony C. Moricca
510 Corwin Lane, Fort Wayne, Ind. 46806

[21] Appl. No. 794,325
[22] Filed Jan. 27, 1969
[45] Patented June 29, 1971

[54] TELEVISION DISPLAY SYSTEM UTILIZING SCANNING BY A SINGLE ELECTRIC PULSE
24 Claims, 26 Drawing Figs.

[52] U.S. Cl. .......... 178/7.3 D
[51] Int. Cl. .......... H04n 3/10
[50] Field of Search .......... 178/7.3 D; 313/108, 108 A; 315/169 TV

[56] References Cited

UNITED STATES PATENTS

| | | | |
|---|---|---|---|
| 2,851,634 | 9/1958 | Kazan | 315/169 TV |
| 3,157,823 | 11/1964 | Clapp | 313/108 A |
| 3,249,804 | 4/1966 | Aiken | 315/169 TV |
| 3,263,225 | 7/1966 | Headle | 178/7.3 D |

*Primary Examiner*—Robert L. Griffin
*Assistant Examiner*—John C. Martin
*Attorney*—Hood, Gust, Irish & Lundy

ABSTRACT: A substantially flat television display device which includes display means such as gas or phosphor material, extending over a display area, these materials luminescing in response to an electric field of predetermined magnitude. Means are provided for propagating an electric wave at a television scanning rate through said luminescing materials in a scanning pattern of a television display. The propagating means includes means for developing an electric field in a localized region of the display area which is in registry with the location of the electric wave, the localized region being of a size corresponding to a picture element in a television display. Means are provided for applying a video-modulated electric field to the luminescing materials conjointly with the field of the electric wave to cause luminescence thereof in said localized region, neither of the aforementioned fields alone being of sufficient magnitude to produce such luminescence.

The method of this invention includes the steps of propagating an electric wave at a television-scanning rate through a luminescing means in a pattern corresponding to the scattered scanning pattern of a television display. Such luminescing means may take the form of many different luminescing materials which may be excited into luminescence by the application thereto of an electric field. The luminescing means is coextensive with the display area of an image display device. The electric wave is utilized to produce an electric field in a localized region of the display area which propagated in synchronism with the electric wave, the localized region being of a size corresponding to a picture element in a television display. Also included is the step of applying a video modulated electric field to the luminescing means conjointly with the field of the electric wave to provide a conjoint electric field of a magnitude which causes luminescence in said resultant region in registry with the propagated position of the electric wave.

INVENTOR.
ANTHONY C. MORICCA,
BY Hood, Gust, Irish & Lundy
ATTORNEYS.

INVENTOR:
ANTHONY C. MORICCA,
BY Hood, Gust, Irish & Lundy
ATTORNEYS.

INVENTOR.
ANTHONY C. MORICCA,
BY Hood, Gust, Irish & Lundy
ATTORNEYS.

INVENTOR.
ANTHONY C. MORICCA,
BY Hood, Gust, Irish + Lundy
ATTORNEYS.

INVENTOR.
ANTHONY C. MORICCA,
BY Hood, Gust, Irish & Lundy
ATTORNEYS.

INVENTOR.
ANTHONY C. MORICCA,
BY Hood, Gust, Irish & Lundy
ATTORNEYS

INVENTOR:
ANTHONY C. MORICCA,
BY Hood, Gust, Irish & Lundy
ATTORNEYS.

INVENTOR.
ATHONY C. MORICCA,
BY Hood, Gust, Irish & Lundy
ATTORNEYS.

INVENTOR.
ANTHONY C. MORICCA,
BY Hood, Gust, Irish & Lundy
ATTORNEYS.

INVENTOR.
ANTHONY C. MORICCA,
BY Hood, Gust, Irish & Lundy
ATTORNEYS.

INVENTOR:
ANTHONY C. MORICCA,
BY Hood, Gust, Irish & Lundy
ATTORNEYS.

INVENTOR:
ANTHONY C. MORICCA,
BY Hood, Gust, Irish & Lundy
ATTORNEYS.

TELEVISION DISPLAY SYSTEM UTILIZING SCANNING BY A SINGLE ELECTRIC PULSE

BACKGROUND OF THE INVENTION

1. Field of the Invention

The present invention relates to a television-receiving system and more particularly to a television system which employs electric fields for scanning and display purposes.

2. Description of the Prior Art

Conventional television-receiving systems employ as a display device a cathode-ray tube in which the electron beam is scanned to reproduce a raster and modulated to provide an image. The luminescing material is a phosphor and the cathode-ray tube itself is a relatively large, expensive item having a limited lifetime of usefulness.

SUMMARY OF THE INVENTION

In accordance with the broader aspects of this invention, there is provided a television-receiving system which includes means for providing a television display having a display area. The display means includes luminescing material extending over said display area which luminesces in response to an electric field of predetermined magnitude. Means are provided for propagating an electric wave at a television-scanning rate through said luminescing means in a pattern corresponding to the scanning pattern of a television display, said propagating means including means for developing an electric field in a localized region of said display area which is in registry with the location of said electric wave, said localized region being of a size corresponding to a picture element in a television display. Also provided are means for applying a video-modulated electric field to said luminescing means conjointly with the field of said electric wave, thereby to provide a localized field at a magnitude which causes luminescence thereof in said localized region in registry with the propagated position of said electric wave. In one embodiment of this invention, the electric wave is a voltage wave or pulse of electrical energy and the video modulation applying means includes a modulated voltage wave. The luminescing means may take the form of gas or phosphor or a combination of these.

Embodied within this concept is a display device of planar construction resembling a picture which can be hung on a wall, the device being relatively thin.

Also contemplated is the method of reproducing a television image comprising the steps of propagating an electric wave at a television scanning rate through a luminescing means such as gas or phosphor in a pattern corresponding to the scanning pattern of a television display. A typical scanning pattern is the conventional television raster containing 525 horizontal lines. The luminescing means is coextensive with the display area of an image display device. The method includes utilizing the electric wave to produce an electric field in a localized region of said display area which propagates in synchronism with the electric wave. The localized region is of the size corresponding to a picture element in a television display. Conjointly with the foregoing there is applied a video-modulated electric field to said luminescing means so as to provide a conjoint field of a magnitude which causes luminescense in said localized region in registry with the propagated position of the electric wave. The most general conceptual embodiment of this invention employs in the display device a transmission or delay line structurally arranged according to the pattern of a television raster. The transmission or delay line is scanned by means of a voltage or current pulse of extremely short duration, the length of time required for the pulse to scan the complete raster being the same as is required in present day television systems for the cathode-ray beam to scan one frame. This scanning pulse alone lacks sufficient energy to cause luminescence of the luminescing means. In order to produce luminescence, there is added to the pulse video information in the form of a video-modulated current or voltage which is of sufficient magnitude that when it is added to the pulse, a momentary, localized signal is produced in the luminescing means which causes luminescence thereof. Thus, as the scanning pulse travels down the transmission or delay line, the conjoint action of this pulse with the modulation produces the luminescence required in the display area for reproducing an image. This concept may be embodied in many different forms, certain of these being described in the following and illustrated in the drawings.

It is an object of this invention to provide in a television-receiving system a display device in which luminescence is produced by the conjoint action of a scanning pulse and video modulation, the scanning pulse being scanned throughout the display device at a rate and in accordance with the scanning pattern of a television display.

It is another object of this invention to provide in a television-receiving system a display device which is relatively flat and thin and resembles a picture which may be hung on a wall.

It is still another object of this invention to provide in a televison-receiving system a luminescing material coincident with the display area and the utilization of a transmission or delay line arranged throughout the area in the form of a television scanning pattern for determining the time and movement pattern of a scanning pulse which, when combined with video information, produces luminescence in the form of a reproduced image.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

Figure 1:
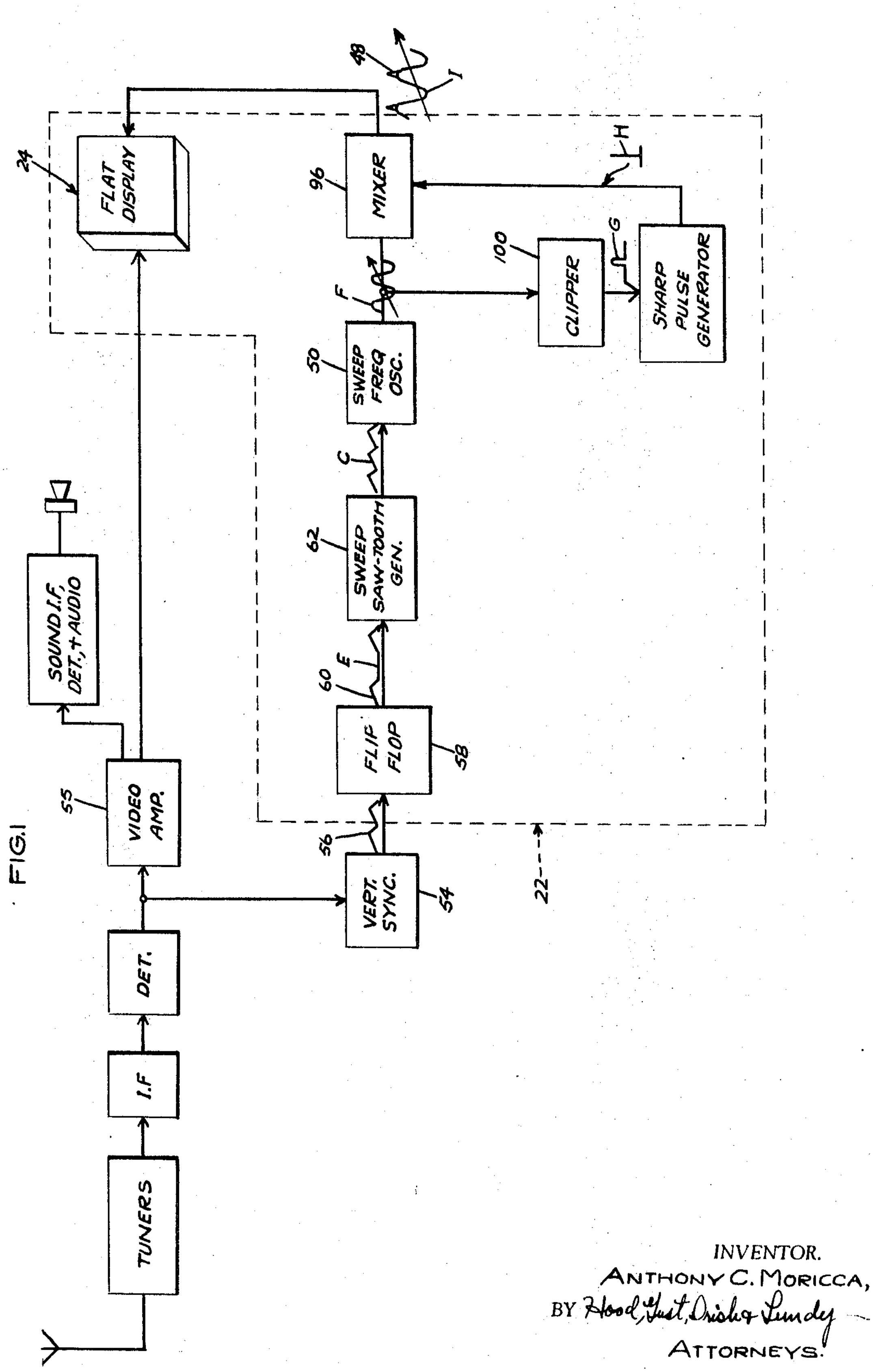
FIG. 1 is a block diagram of a television receiver made in accordance with the principles of this invention.

The embodiments of this invention herein disclosed have been designed specifically for black and white television receivers of conventional design except in those respects in which specific mention is made of deviation from the conventional. The television receivers herein described are adapted to reproduce television signals conventionally telecast, these signals including video and synchronizing information whereby a television image is reproduced in a two-dimensional area display. The same television raster of 525 horizontal lines scanned at the rate of 30 times per second is contemplated; however, it will be understood that this invention is not limited to this particular scanning pattern or rate but may be modified to employ other known patterns and rates.

In the reproduction and display of a television image, the present invention employs transmission line theory well known in the field of electronics. A time delay exists when a pulse of electrical energy is transmitted the length of a transmission line. This delay in time is dependent upon the inductance and capacitance, $(LC)^{1/2}$, of the transmission line. The time delay, or propagation time, can be determined and controlled by the selection of the constant L and C. In this invention, such a transmission line is used to control the transit time of an electric wave along a path corresponding to a television raster scanning display. The electric wave itself is utilized in producing spot luminescence in a planar body or volume of luminescing material, and such spot is modulated in accordance with video information to produce different intensities of brightness so as to produce a gray scale in a television image.

This may be generally explained as follows. Consider for the moment a straight two-wire transmission line composed of two wires closely spaced and parallel. Also consider that these two wires are contained in a relatively long gastight, transparent envelope containing one of the noble gases at subatmospheric pressure. Upon the application of a suitably high DC potential to the transmission line, a gas discharge between the two wires can be produced which is visible. By applying an alternating wave to the transmission line, at a frequency which will produce a standing wave, the gas can be made to luminesce on those length portions of the transmission line which corresponds to the nodes, assuming, of course, that at least a portion of the nodes exceeds the ignition point of the gas. If the frequency of the standing wave and the length of the transmission line are so related that only a single wave between a quarter and half wavelength long appears on the line, the gas will luminesce at only a single point along the line corresponding to the portion of the node which exceeds the ignition point of the gas. The sharper or narrower in time the node is made, the smaller will be the quantity of gas which ignites and luminesces.

Since a television image is regarded as being composed of a huge number of elemental picture areas or spots of light, it becomes necessary to limit the size of the gas luminescence at any instant of time to a corresponding elemental area.

In one embodiment of this invention this is accomplished by superimposing a sharp pulse or spike of electric energy or voltage onto the node of a standing wave, only the spike or pulse portion being of sufficient amplitude to ignite the gas. Thus, with such a narrow pulse of electrical energy applied to the transmission line, and assuming that the standing wave is of fixed frequency, only one spot of light will appear along the length of the transmission line. By propagating this narrow pulse down the line, it at once becomes obvious that the spot of light can also be caused to move in synchronism therewith. This movement of the narrow pulse may be accomplished by varying the frequency of the standing wave between lower and upper limits, the lower limit being the frequency at which the standing wave is a quarter wave length of the transmission line and the upper limit being a half wavelength. By increasing continuously the frequency linearly between the lower and upper limit, the narrow pulse can be made to move from one end of the transmission line to the other causing a spot of light to progress correspondingly down the line.

It it will now be considered that this same transmission line can be helically wrapped around a panel or planar core of insulating material in equally spaced turns, and there are 525 of these turns, the pulse can be made to travel around this panel, sequentially first across the front side and then along the back side. If this panel is submerged in the same gas previously described, the spot of light can be made to follow this helical path sequentially along the front and back side. In viewing the front side of the panel, if the transmission line is arranged thereon in straight parallel portions closely spaced and there are 525 such portions, the raster of a conventional television display may be geometrically duplicated.

By causing the pulse to propagate sequentially along the individual lines on the front side at a linear rate corresponding to the trace time in a conventional television raster, and then to return along the back side at horizontal retrace velocity, it will be seen that the pulse can be made to duplicate the motion of an electron beam in a television picture tube.

Having thus produced a propagating spot of light in raster form, it will at once become obvious that by modulating this spot of light with video information, a television image can be reproduced.

In the arrangement just described, the scanning pulse is caused to propagate throughout the display pattern by means of varying the frequency of a standing wave between lower and upper limits as previously described. This particular method of propagating the scanning pulse constitutes one embodiment of this invention.

A second embodiment of this invention utilizes the same transmission line concept without the standing wave and uses instead built-in time-delay sections which determine the transit time of a narrow pulse applied to the input end of the line. This may be characterized as the delay-line concept of this invention wherein a pulse is propagated along a transmission line structurally arranged as a television raster at controlled velocities corresponding to trace and retrace times.

While the use of gas has been indicated as being the luminescing material, as will become apparent from the explanation that follows, other materials which luminesce in response to electric fields of predetermined magnitude may be utilized instead. Such materials include electroluminescent phosphors, liquid crystals, radiation sensitive phosphors and the like. The standing wave concept previously mentioned, is explained in connection with the embodiment of this invention shown generally in FIG. 1 and the delay line concept in connection with the embodiment of FIG. 13*a*.

Figure 10:
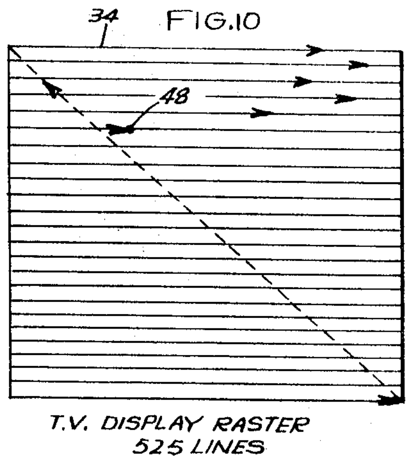
FIG. 10 is a diagram illustrating the conventional television display raster.
Figure 9:
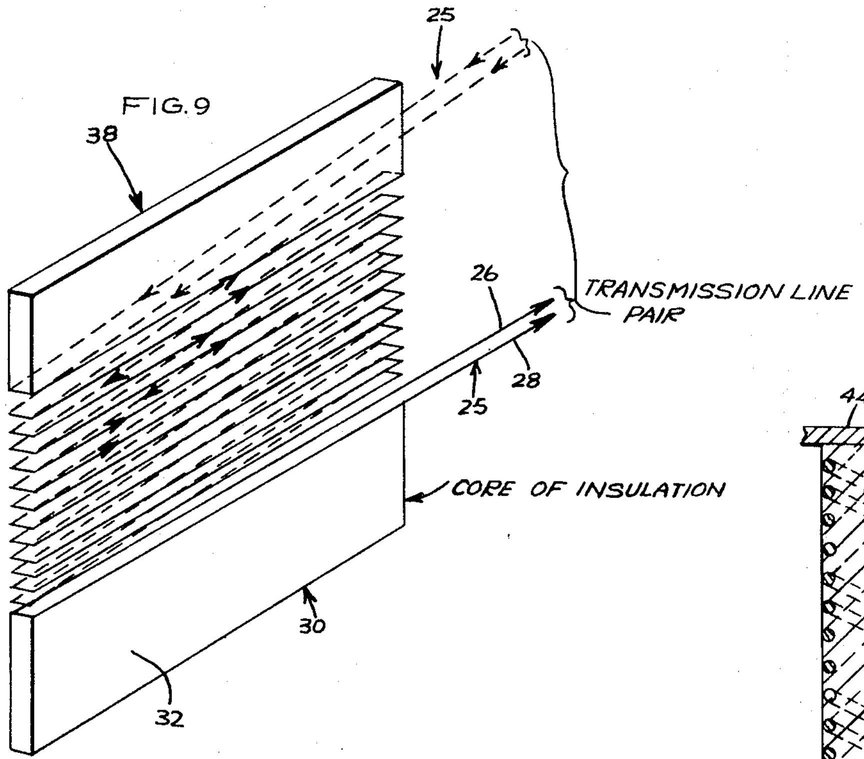
FIG. 9 is a perspective illustration showing the construction of the transmission line employed in the embodiment of FIGS. 7 and 8.

FIG. 1 illustrates, in block diagram form, a television receiver conforming to the principles of this invention, those portions of the receiver outside of the dashed line block 22 being conventional. Those portions inside the block 22 are specifically adapted for use in this invention and are illustrated in schematic diagram form in FIG. 2. However, before describing this circuitry, a general explanation will be given of the display device of this invention and the operation thereof. Such a display device is indicated by the numeral 24 in FIGS. 1 and 2 and is shown in detail in FIGS. 7, 8, 9, 10 and 11. This display device 24 employs a form of transmission line which is wrapped in helical form on a flat core of insulation to provide a display surface on which the transmission line has portions corresponding to the horizontal lines of a conventional television raster. Such a raster is diagrammatically shown in FIG. 10, with the transmission line as arranged on core 30 of insulation, such as glass or plastic, being shown in FIG. 9. Briefly, the transmission line 25 includes two conductors 26 and 28 which are spaced apart and parallel much like a conventional Lecher line. Each turn of the line 25 is spaced apart such that the geometric pattern of the raster of FIG. 10 is duplicated on the front face or display side 32 of the core 30. The two conductors 26, 28 across the face 32 constitute the equivalent of one horizontal line 34 of the raster of FIG. 10, the spacing and size of these conductors 26 and 28 being explained more fully later in the description. Suffice it to say, there are 525 turns on the core 30, one for each raster line. The conductors across the face 32 are straight and horizontally aligned, the spacing between adjacent conductor pairs being substantially equal. FIG. 9 is diagrammatic only and is illustrative of one design and method which may be employed by wrapping securely the conductor pair around the core 30.

According to transmission line theory, a time delay exists when a pulse is transmitted the length of the transmission line and returns. This delay in time is dependent upon the $(LC)^{1/2}$ of the transmission line. This time delay, or travel time, can be determined and controlled by the selection of the constants L and C.

In this invention, and again referring to FIG. 9, the conductors 26 and 28 as applied to the core 30 constitute such a transmission line. Assuming, as viewed in FIG. 9, that the distal end of the transmission line 25 at the lower right-hand corner of the core 30 is terminated in the characteristic impedance thereof, and a pulse of short duration is applied to the beginning of the line at the upper left-hand corner of the core 30, the pulse will travel along the line, first across the front face and then along the back face, until it is absorbed or reflected at the terminal end. The time of travel will depend upon the LC constants of the transmission line. The line is so designed that the time of pulse travel across the front face for one turn of the line is linear and nine times longer than across the rear face such that in the reproduction of a television image, the time of travel from one edge to the opposite edge of the core 30 along the front face 32 may be regarded as the active or forward trace portion of the picture-reproducing process while the travel along the back side of the core 30 constitutes the horizontal retrace. By designing the line so as to require one-thirtieth of a second for the pulse to travel through the 525 lines or turns of the raster, conventional television signals may be employed for reproducing an image. This may now be explained more completely referring to both FIGS. 2 and 9. A short voltage or scanning pulse of about one-tenth microsecond is fed to the left hand end of the line 25 and is caused to propagate from one end to the other thereof, as already explained, in one-thirtieth of a second. At the same time, a voltage modulated with video information is applied by means of a transformer 34 (FIG. 2) in such polarity that the amplitude thereof is additive to that of the scanning pulse. A gas at subatmospheric pressure, such as neon, argon and the like, is confined to the space between the conductors 26 and 28 such that when the combined amplitudes of the pulse and modulation voltage exceed the ignition point of the gas, a spot of light will be produced. Neither the scanning pulse or video modulation as applied to the lines 26 and 28 is of sufficient magnitude to ignite the gas; however, the combined amplitudes thereof is sufficient. Assuming for the moment, and merely for the purposes of explanation, that the video modulation is in the form of a DC potential of magnitude just below that required to ignite the gas and this is added to the scanning pulse, as the latter proceeds down the line 26, 28, the gas will be ignited in the space between the conductors 26 and 28 in an area corresponding to the narrowness of the pulse. In slow motion, this would appear as a spot of light traveling along the transmission line 25.

By modulating the DC applied to the line 25 with video information, the gas can be made to luminesce at a location in synchronism with the scanning pulse. By this means, a television image may be reproduced.

One form of the display device 24 will now be described in detail with specific reference being made to FIGS. 7, 8, 9, 11 and 12. The device is essentially flat and rectangular and includes a viewing window 36 of glass or plastic, a transmission line panel 38 as previously described in connection with FIG. 9, a second transmission line panel 40 identical to panel 38 and a back panel 42 of insulation contiguous with the panel 40. The panel 38 is separated from the two panels 36 and 40, all of the panels being fixedly peripherally secured into place by means of a metallic frame 44. The two panels 36 and 38 in combination with the peripheral frame 44 form a planar shape, gastight compartment 46 in which a luminescing gas such as neon or argon at subatmospheric pressures is confined.

The panel 38 constitutes the display portion of the display device 24 while the panel 40 with the transmission line 25*a* thereon constitutes the electrical termination for the transmission line 25 on the panel 38. The distal end of the transmission line 25 on the panel 38, is connected to the proximal end of the line 25*a* on the panel 40, the distal end of the line on the panel 40 being terminated by an open circuit so as to provide for wave reflection as commonly understood. By using the transmission line 40 constructed identically to that of the panel 38, a near perfect termination for the transmission line 25 on the panel 38 may be achieved.

Figures 7, 8:
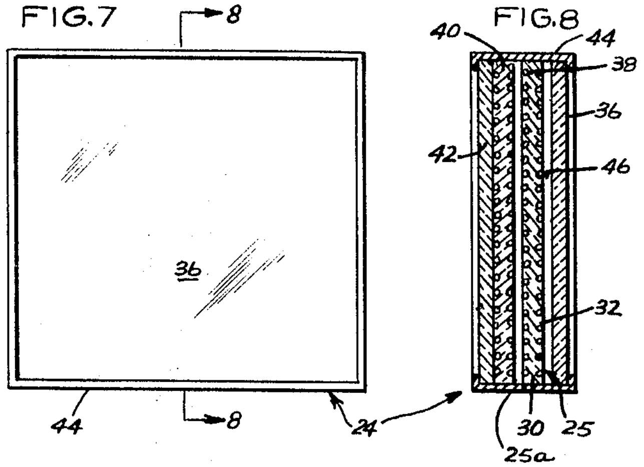
FIG. 7 is a front view of a display device constructed in accordance with the principles of this invention.
FIG. 8 is a cross section taken substantially along line 8–8 of FIG. 7.
Figure 11:
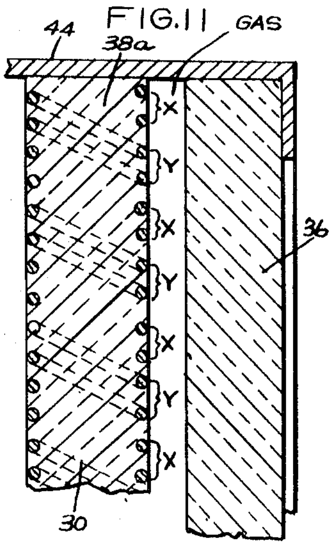
FIG. 11 is an enlarged fragmentary portion of the view of FIG. 8.

The transmission line 25 shown in FIGS. 8 and 9 is arranged on the insulation core 30 such that each helix or turn of the line 25 is adjacent to the next turn. The portion of each turn on the front 32, therefore, coincides with one line of a conventional 525-line television raster. As shown in FIG. 11, however, this invention may be embodied in a form as will provide for scanning interlace, with the line being applied to the core 30 such that each turn or helix on the core 30 has double the pitch of the arrangement described in connection with FIGS. 8 and 9. The line is applied to the core 30 with two sets of helices or turns, each set having one-half of the 525 turns previously described, the distal end of the first set being connected back to the proximal end of the second set such that the two interlaced helices are connected in series. In FIG. 11, one set is indicated by the letter X and the interlaced set by the letter Y.

The transmission line may be held in place by accurately formed grooves in the core 30 or may be applied as thin films in accordance with conventional printed or integrated circuit techniques. In one working embodiment of this invention, the core 30 was formed of transparent plastic and the transmission line of copper wire 0.005 inch in diameter. Grooves were formed in the opposite faces of the core 30 to receive and secure the conductors in place. The grooves were of such depth and width so as to secure firmly the conductors in place with the outer surfaces thereof flush with the respective surfaces of the core. The center spacing between the conductors 26 and 28 was maintained at 0.017 inch and the spacing between wires of adjacent turns the same dimension. A suitable gas pressure for this arrangement is one-tenth atmospheric pressure with the gas being neon. Further design information for a device having a display area of 18 inches high by 24 inches wide will be given in connection with later description.

Figure 12:
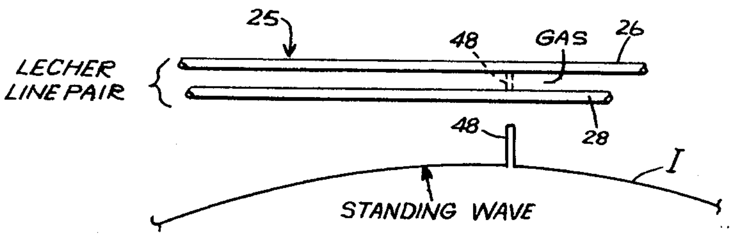
FIG. 12 is a fragmentary illustration of a portion of the transmission line employed in the arrangement of FIGS. 7, 8, 9 and 11 and a representation of a scanning pulse of voltage applied to the line in the manner of this invention for producing a scanning raster.

In FIG. 12, a short length of the transmission line 25 is shown with a scanning pulse 48 being applied thereto as shown. By controlling the amplitude of the pulse 48 such that it exceeds the ignition potential of the gas between the two conductors 26, 28, the gas may be made to ignite in the precise space occupied by the pulse. Thus, as the pulse 4 moves down the line, the gas will be ignited in coincidence with the pulse and be observed as a moving spot of light.

Now referring to FIGS. 1 through 6, the generation of the scanning pulse 48 and the application thereof to the transmission line 25 will be described.

Figures 2, 2A:
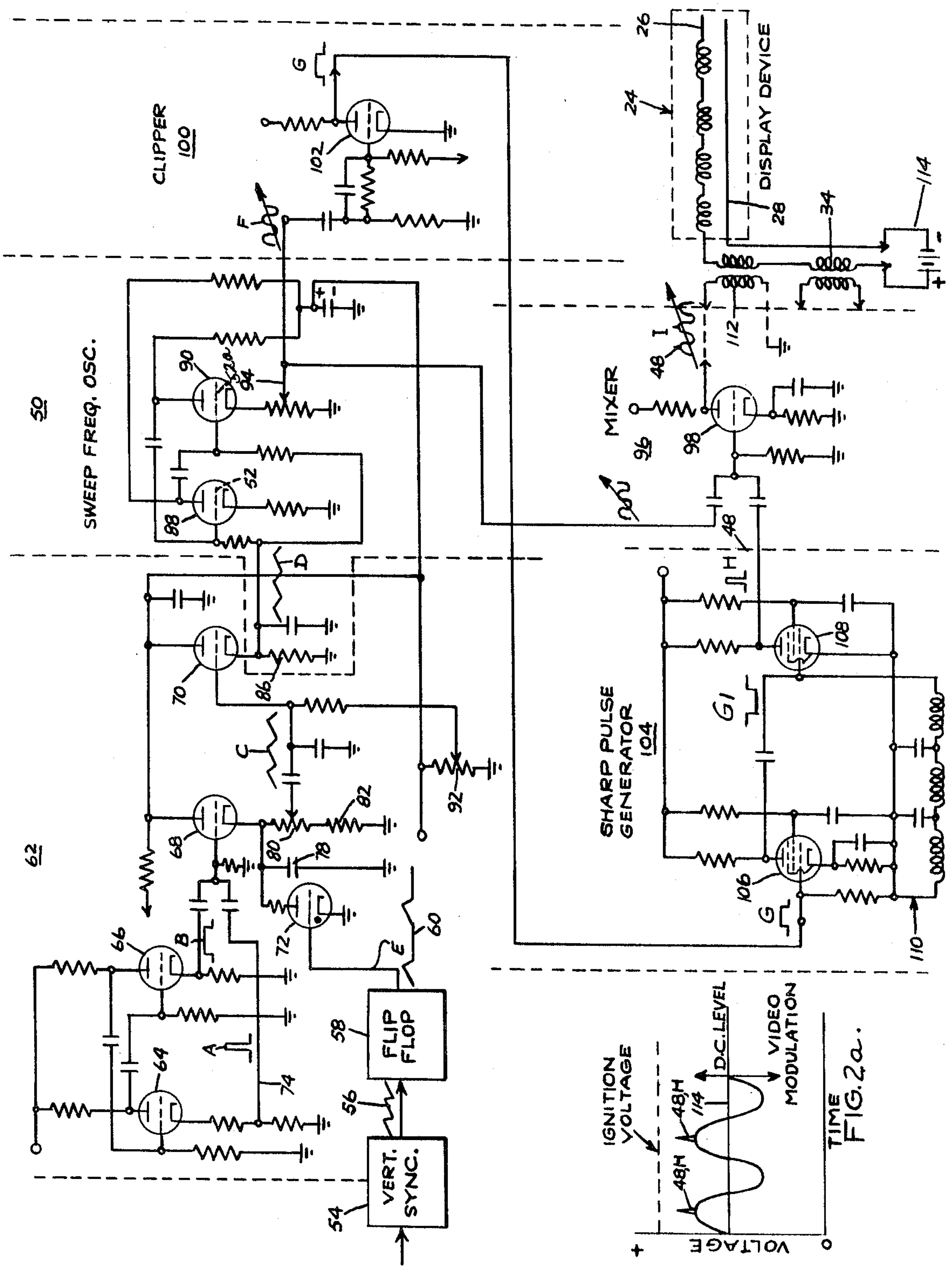
FIG. 2 is a schematic diagram of a portion of the circuitry shown in FIG. 1.
FIG. 2*a* is a graph used in explaining the operation thereof.

Generally speaking, this circuitry generates a sine wave at a frequency which will produce a standing wave on the transmission line 25 of the display device 24. By changing the frequency of this standing wave between lower and upper limits, the node can be caused to scan the transmission line 25 from the beginning to the end thereof. By selecting the lower limit of frequency such that the transmission line 25 is a quarter-wavelength thereof and the upper limit such that the transmission line is a half-wave length, a single node can be made to scan the entire length of the transmission line once for each sweep of the frequency from the lower to the upper limit. This variable frequency standing wave, as it is called, is produced by a sweep frequency oscillator 50 (FIGS. 1 and 2). The sine wave or voltage delivered by this oscillator 50 is illustrated in FIG. 6 as applied to the transmission line 25, the low-frequency limit being indicated as 116 kc. and the upper limit as 232 kc. The relative movement of the standing wave node along the transmission line is indicated by the family of curves in FIG. 6 at the various frequencies indicated. The frequency of the oscillator 50 is controlled by the application of a variable bias to the control grids 52 and 52*a*, (FIG. 2) the control signal applied to this grid 52 being in the form indicated by the letters C and D in FIGS. 3 and 5*a*. Generally speaking, this is a sawtooth, thereby indicating that the frequency variation of the oscillator 50 is linear between the lower and upper limits thereof.

The circuitry for generating the control voltage C, D as shown in FIGS. 1 and 2 will now be described. The vertical synchronizing circuits in a conventional television set is indicated by the numeral 54 and delivers vertical retrace waves 56 (FIG. 1) at the repetition rate of 60 per second. These are coupled to a flip-flop multivibrator circuit 58 which reproduces in its output every other one of the repetitive sawtooths delivered by the synchronizing circuits 54. Thus, the flip-flop circuit 58 delivers a conventional vertical retrace sawtooth 60 every one-thirtieth of a second, the duration of this sawtooth corresponding to the vertical retrace time in conventional television receivers.

Figures 3, 4:
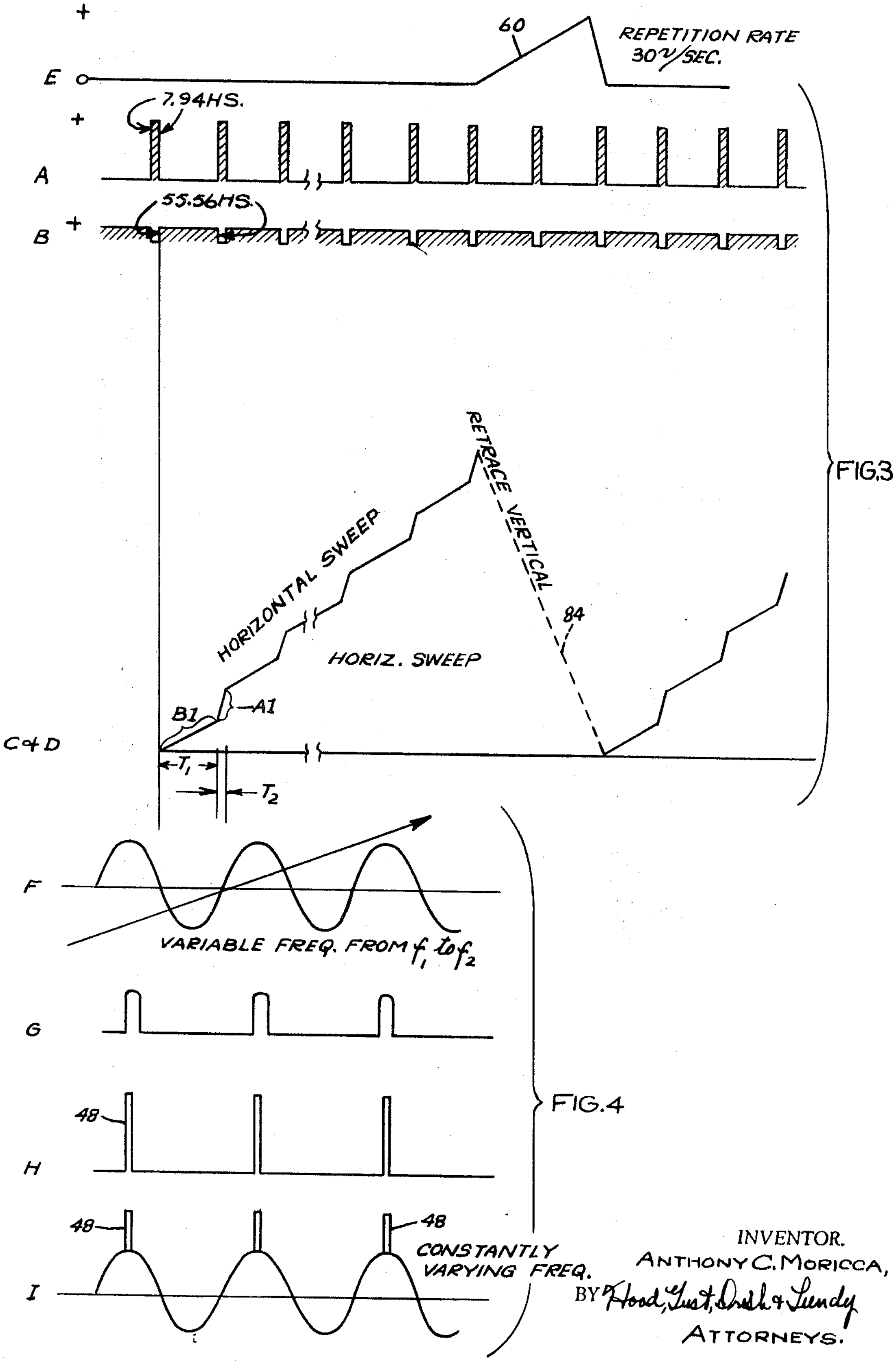
FIGS. 3, 4, 5*a*, 5*b* and FIG. 6 are waveforms used in explaining the operation of this invention.

The output of the flip-flop multivibrator 58 is fed to a sweep generator 62 which includes five tubes 64, 66, 68, 70 and 72, the first four being high vacuum triodes while tube 72 is a gas triode. The two tubes 64 and 66 form a part of a fixed frequency multivibrator having two output circuits 74 and 76, respectively, which deliver two synchronized pulse trains indicated by the letters A and B in FIG. 3. This circuit is so designed that the pulse repetition rate is 15,750 pulses per second with each pulse A being of duration one-ninth that of each pulse B but nine times greater in amplitude than B. Ideally, these should be of square wave form having vertical leading and trailing edges. The relative amplitudes and durations of the pulses A and B in the two trains are shown in FIG. 3. The time relationship between the pulses 60 of the wavetrain E and the two trains A and B is also shown, each pulse A occupying the space between adjacent pulses B.

A time constant circuit composed of a charging capacitor 78 and two resistors 80 and 82 are coupled into the cathode of a normally conducting triode 68 as shown. Shunt connected across the capacitor 78 is a gas triode 72 having its control grid connected to the output circuit of the flip-flop multivibrator 58. Each time one of the waves 60 from a flip-flop multivibrator 58 is applied to the control grid of the tube 72, the latter fires and conducts. At all other times, this tube 72 is nonconducting. During the period of conduction, the tube 72 shorts the capacitor 78 and thereby discharges it. During periods of nonconduction of the triode 72, the capacitor 78 charges by reason of the voltage developed across the two resistors 80 and 82 as determined by the conductivity of the tube 68.

The tube 68 conducts continuously. Its conductivity is increased, however, by the application of each pulse A (FIG. 3) thereto, this increased current producing an instantaneous increase in voltage across the two resistors 80 and 82, thereby applying a more rapid charge to the capacitor 78 as indicated by the portion A1 in the curves C and D of FIG. 3. Upon the termination of each pulse A and the initiation of the successive pulse B, the tube 68 conducts less current, thereby developing less voltage across the resistors 80 and 82 and charging the capacitor 78 at a slower rate B1 shown in the curves C and D. It will now be seen that the curves C and D represent the rate of charging the capacitor 78, this rate being linear and relatively slow for the period of each pulse B but rapid and linear for each pulse A. It should be noted that the energy contained by each pulse A is equal to that of each pulse B such that the total charge increase as measured in potential on the capacitor 78 is the same with the occurrence of each pulse A and B, the only variable being the charging rate. As shown in both FIGS. 3 and 5*a*, the charging rate of the capacitor 78 is somewhat stairstepped.

It may now be noted that the duration of each pulse B corresponds to the active horizontal trace time of the television display, while the duration of each pulse A corresponds to the horizontal retrace time.

The capacitor 78 will continue to charge according to the stepped configuration of graphs C and D until the vertical retrace pulse 60 occurs, at which time the gas triode 72 is fired, causing discharge of the capacitor 78. The duration of the pulse 60 corresponds to the usual vertical retrace time and is illustrated graphically by the dashed line portion 84 of the curves C and D. Thus, considering the scanning of one television frame of 525 lines, there will be 525 pulses A and B effective in charging the capacitor 78 before the occurrence of one vertical retrace pulse 60. Stated otherwise, there is one pulse 60 for each 525 pulses A and B.

A variable tap on the resistor 80 leads to the control grid of a normally conducting triode 70, thereby controlling the conductivity of the latter precisely in accordance with the waveform of graphs C and D. The cathode of triode 70 is grounded through a cathode resistor 86 across which is developed waveform D identical to waveform C. This waveform D is coupled to the control grid 52 and 52*a* of triodes 88 and 90 which forms one part of the sine wave oscillator 50, which also includes tube 90. The frequency of this oscillator is controlled by the bias applied to the control grids 52 and 52*a*. This bias is varied in accordance with the waveform D just described such that the frequency of the oscillator increases linearly relatively slowly for the portion B1 of the curve D and rapidly for each portion A1 thereof.

A potentiometer 92 having a tap connected to the control grid of the tube 70 serves in controlling the frequency at which the oscillator 50 starts for the beginning of each biasing wave D. Thus, as will become apparent later on, this potentiometer 92 serves as a control for determining the lower limit of frequency sweep of the oscillator 50. This also controls the start of the pulse 48 scanning the transmission line in the display device 24.

The varying sine wave output of the oscillator 50 is indicated by the letter F in FIGS. 1, 2 and 4. This same sine wave output is shown in FIG. 6 as it is applied to the transmission line of the display device 24. As explained earlier, the transmission line 26, 28 is so designed that standing waves will be produced thereon at the frequencies generated by the oscillator 50. This will be explained later in more detail.

The output circuit 94 of the oscillator 50 is connected to the input circuit of a mixer 96 which includes a normally conducting triode 98. The sine wave output of the oscillator 50 therefore appears in the output circuit of the tube 98 in the form of the sine wave portion of wavetrain I of FIG. 4.

The same output circuit 94 of the oscillator 50 is connected to the input circuit of a clipper 100 which contains a triode 102 biased such that only the peaks of the sine wave appear in the output circuit thereof in the form of the pulses indicated by the letter G in FIG. 4. These pulses closely approximate square waves.

These pulses G are applied to the input circuit of the "sharp pulse generator" 104 which contains two pentodes 106 and 108 having a delay line 110 coupled therebetween as shown. The pulse G applied to the tube 106 which is normally conductive is inverted as pulse G1 in the output circuit and is applied to the control grid of tube 108 and also to the delay line 110. The leading edge of this pulse G1 produces the leading edge of the output pulse H in the anode circuit of the tubes 108 and also charges the capacitive portion of delay line 110. This charge on the delay line 110 maintains the tube 108 conductive until the leading edge of pulse G1 has time to travel down the delay line 108 and be reflected in inverted condition to the beginning thereof. Because of this inversion, the capacitances in the delay line are discharged, thereby returning the control grid of the tube 108 to idling condition producing the trailing edge of the pulse H. The delay designed into the line 110 is 0.02 microsecond, which becomes the width of the pulse H. This 0.02-microsecond pulse determines the size of the spot produced in the display device 24 in the reproduction of a television image. In other words, this pulse duration corresponds to the size of the cathode ray beam in a conventional picture tube in the development of a spot of light.

This pulse H occurring with each node of the sine wave F from the oscillator 50 is coupled to the input circuit of the mixer 96. The result is the wave I in the output circuit of the tube 98, which is a combination of the sine wave F and the pulse train H. The polarities are such that the pulses H are added to the same portion of each cycle of the sine wave F to produce the waveform depicted by the letter I in FIG. 4.

A transformer 112 in the output circuit of the mixer 96 is used to couple the wavetrain I to the transmission line 25 of the display device 24 (see FIG. 2). This results in producing standing waves on the transmission line 25, the node of each wave having a pulse 48 superimposed thereon.

The peak amplitude of the wave I (the pulse 48) is so controlled as to be below the ignition voltage of the luminescing gas used in the display device 24 when added to the potential of a DC source indicated by numeral 114.

A voltage generated by the video amplifier 55 (FIG. 1) in the television receiver is coupled in series with one of the conductors 26, 28 by means of the transformer 34 so as to increase the amplitude of the voltage supplied by the DC source 114. The amplitude of the video-modulated voltage is so controlled that for the portions of the video signal corresponding to black, the peak portion of the pulse 48 will be maintained below ignition voltage of the gas but for the brightest portions of the image, the peak portion will exceed the ignition voltage of the gas to a maximum extent. It may now be stated that the amount by which the voltage of the scanning pulse 48 exceeds the ignition voltage of the gas determines the size and brightness of the spot produced in the gas. This is the means by which a gray scale is produced in the development of a television image.

FIG. 2*a* is illustrative of the amplitude relationships between the standing wave I, the ignition voltage of the luminescing gas, the magnitude of the DC source 114 and the applied video modulation.

The precise method of producing a scanning raster will now be described. As explained previously, the scanning of one horizontal line and retrace corresponds to two successive pulses A and B of FIG. 3 and also the portions A1 and B1 of the waveforms C and D. Considering that the transmission line 25 on the display panel 38 of the display device 24 (FIGS. 7 and 8) begins at the upper left-hand corner of the core 30, as shown in FIG. 6, for a frequency of 116 kc. for the wave I, a standing wave will be produced having a peak portion at the beginning of the line. In FIG. 6, the abscissa represents the line length, with the zero value being the proximal end of the line. As the wave I increases in frequency moving through the portion B of scanning waves C and D, the standing wave frequency is increased linearly until the peak thereof advances from the left-hand edge of the core 30 to the right-hand edge thereof. At this time, the rate of frequency change suddenly increases in accordance with the portion A1 of waveforms C and D causing the standing wave node to proceed down the back side of the core 30 from the right-hand edge to the left-hand edge thereof at a rapid rate corresponding to the horizontal retrace time. At the end of this wave portion A1 and the beginning of the next portion B1, the standing wave node or peak will be located at the beginning of the second line at the left-hand edge of the core 30 and will start moving toward the right-hand edge as before. This trace and retrace motion of the scanning node continues until the entire transmission line 25 has been covered from one end to the other thereof. In FIG. 6, this is represented by the family of standing waves, the frequency of the standing wave at the completion of a scansion being 232 kc. and at the beginning thereof 116 kc. Upon completing a scansion, the frequency of the oscillator 50 is returned to the value of 116 kc. so as to repeat the scanning motion.

The standing wave in this embodiment of the invention is utilized to move the scanning pulse 48 through the complete scansion, only this pulse 48 being utilized as the portion of the standing wave which exceeds the ignition voltage of the luminescing gas. Thus, at any instant of time throughout the display surface 32 of the display device 24, a single pulse 48 will appear electrically at a given location on the transmission line, depending upon the frequency of the standing wave. As the frequency of the standing wave advance, the pulse 48 propagates along the line 25. This is illustrated more clearly in FIG. 5*b*, wherein the relationship between the scanning pulse 48 and the portions A1 and B1 of the frequency control voltages C and D are shown. In a specific embodiment of this invention, one complete helix or turn of the transmission line 25 on the core 30 is designed to be 4 feet, 2 feet on the front side and 2 feet on the back side neglecting edge dimensions. Thus, the scanning pulse 48 is made to sweep the first 2 feet on the front side during the occurrence of portion B1 of the control signal C and D and the 2 feet on the back side during the occurrence of the wave portion A1 thereof. The pulse 48 is shown in different dashed line positions progressively along the transmission line in FIG. 5*b*, the particular frequency of the standing wave which determines the position of the scanning pulse 48 being indicated on the abscissa.

Figure 5A:
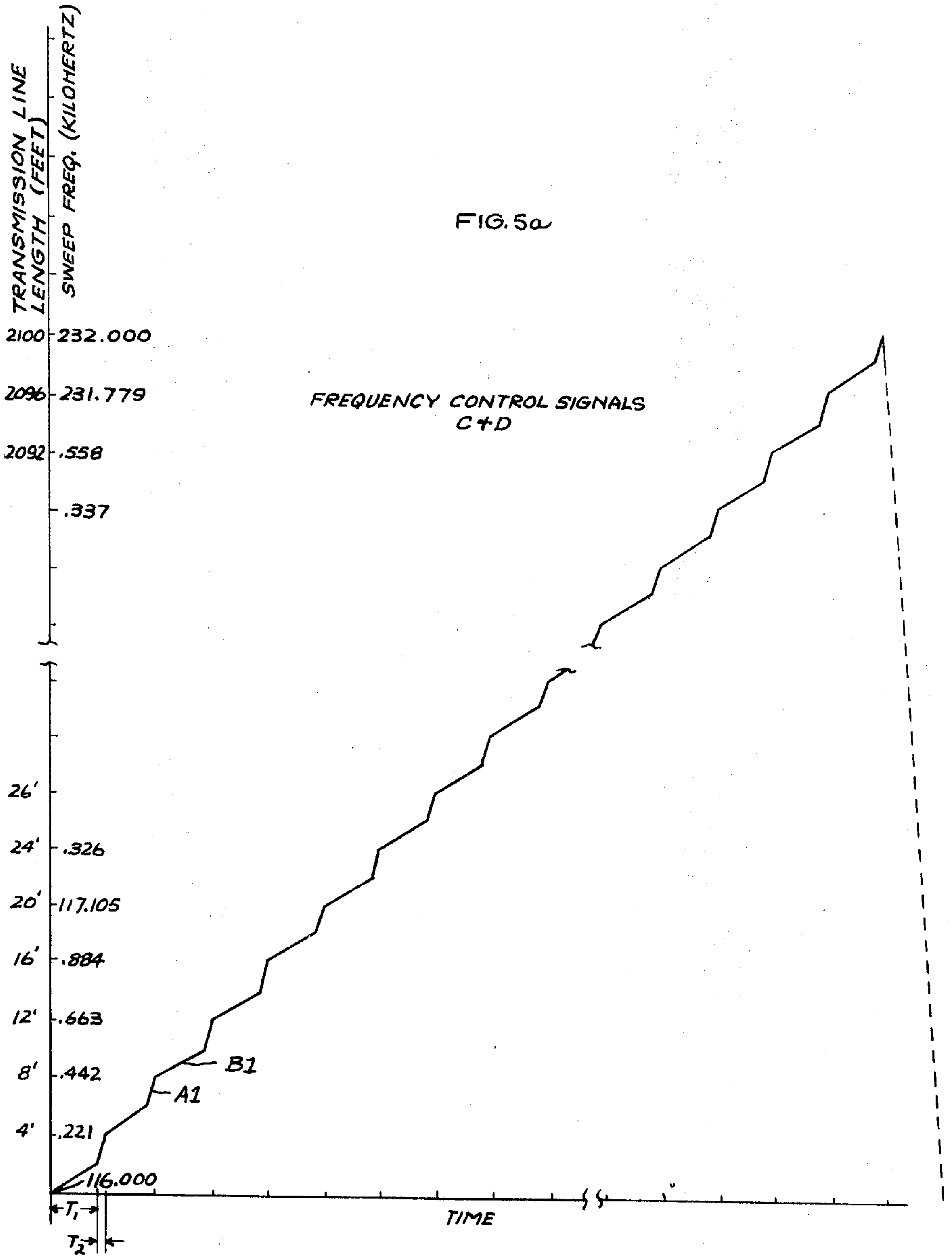
Figure 5B:
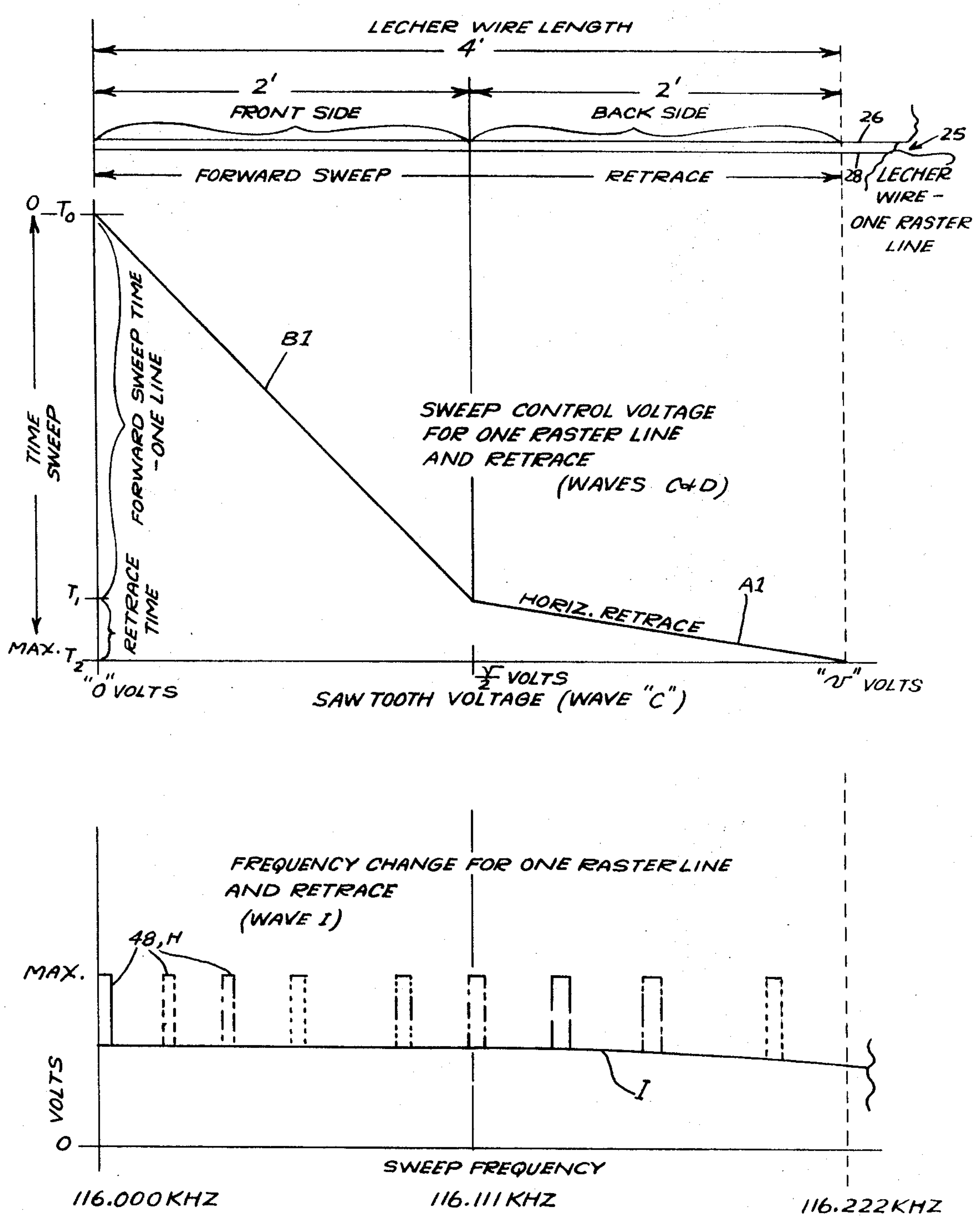
Figure 6:
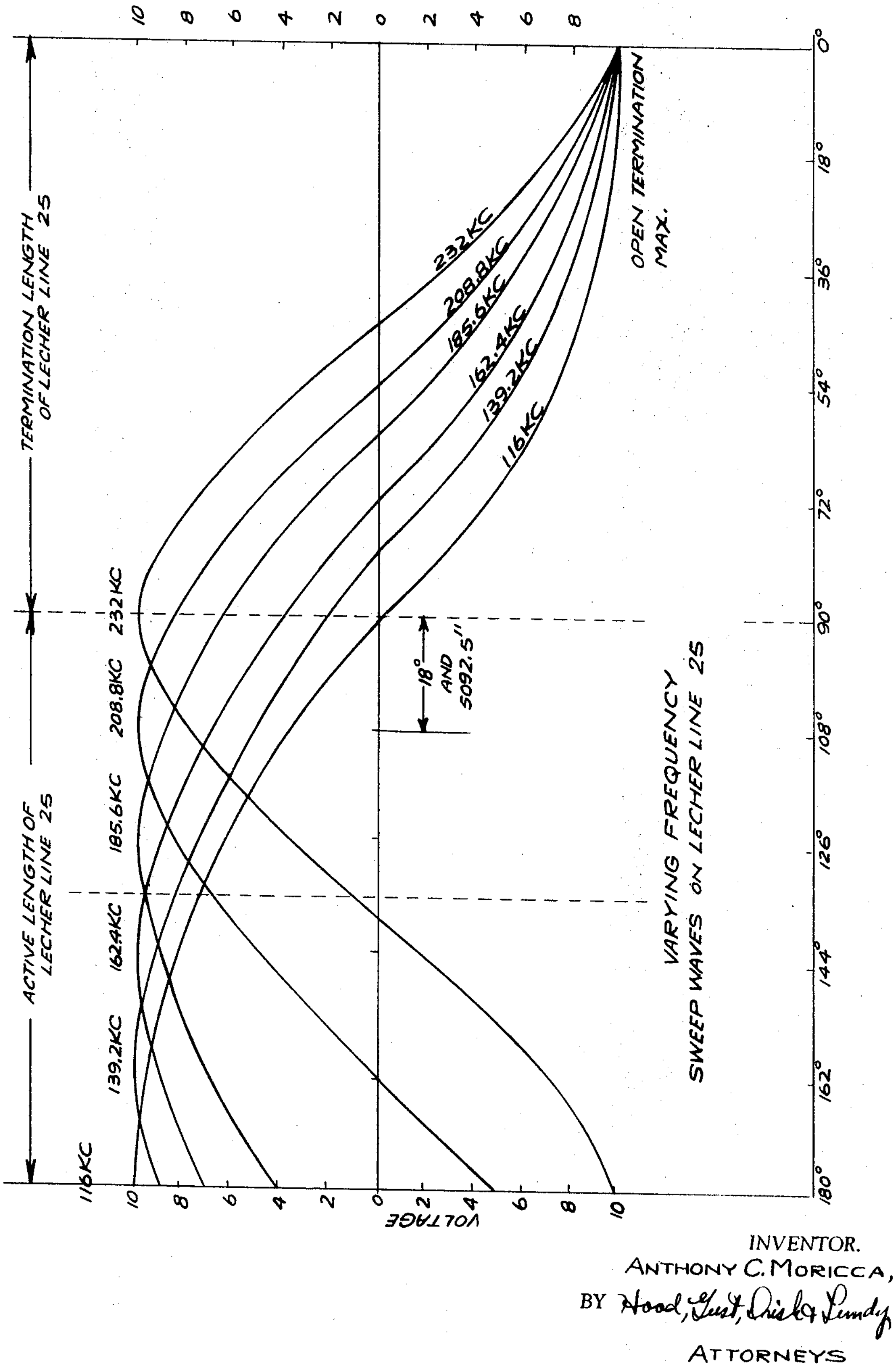

Further with respect to this specific embodiment, reference may be had to FIG. 5*a* wherein the length of the transmission line 25 is directly related to the sweep portions A and B of the frequency control signals C and D. Also, the frequency of the standing wave is also related thereto thereby indicating the position of the pulse 48 on the transmission line 25 for any given frequency. For example, at the beginning of the scan, the frequency of the standing wave is 116 kilohertz whereas at the end of the scanning the frequency is 232 kilohertz. The length of the transmission line 25 on display panel 38 is indicated as 2,100 feet.

With respect to the wave trains A and B, in the working embodiment just discussed, the duration of each pulse A is 7.94 microseconds and for each pulse B, 55.6 microseconds. The potential of the DC source 114 is adjusted to operate at a value of about 64 volts which is below the ignition voltage of the gas in the display device 24, and the amplitude of the pulse 48 on the wave train I when added to the voltage of the DC source 114 is designed to be just short of that of the ignition voltage such that when video modulation is added, the pulse 48 will be driven through the ignition potential thereby causing luminescence of the gas.

In operation, a typical television signal is received by the receiver and the video and synchronizing components thereof fed to the display device 24 as already described. The potentiometer 92 is adjusted such that the scanning pulse 48 starts at the upper left-hand corner of the scanning raster immediately following termination of the vertical retrace pulse 60 (wave train E). The frequency control signals C and D thereupon vary the frequency of the oscillator 50 as described causing the pulse 48 to be scanned to the end of the raster pattern following which the pulse 60 of the wave train E occurs, discharging the capacitor 78 (FIG. 2), thereby starting the generation of the frequency control signals C and D for another scansion. The circuitry is so designed that the display device will be scanned 30 times each second in conformity with conventional scanning systems. The video signal from the video amplifier of FIG. 1 applied to the display device 24 results in varying the amplitude of the scanning pulse 48 causing it to exceed the ignition potential of the gas, the voltages being so selected that for video signals corresponding to black, the pulse height 48 will be insufficient to ignite the gas but for the brightest portions of the picture, the potential of the pulse 48 is caused to exceed the ignition potential by a maximum amount. For gray scale, the peak voltage of the pulse 48 will lie between these maximum values.

Brightness in the display device 24 is increased by reason of an increase in the potential or electrical energy of the pulse 48 over the ignition value which produces greater ionization and a larger spot of luminescence. This spot is smaller for lower pulse potentials.

By applying video modulation as just described during the scanning of the pulse 48 throughout the raster pattern, a visible replica of the video information in the television signal is reproduced on the display device.

A second embodiment of this invention is illustrated in FIGS. 13*a*, 13*b*, and 14 through 22. In this embodiment, no standing wave like the wave I of FIG. 4 is used for propagating the scanning pulse 48 through the raster. Instead, the display device is designed with a transmission line having delay characteristics which control the propagation of a pulse like pulse 48 to conform with the standard scanning patterns and rates. Inasmuch as a simple transmission line, such as Lecher wire, cannot conveniently be designed to delay a short duration pulse, such as the scanning pulse 48, sufficiently to provide a delay time of one-thirtieth of a second for one complete scansion of the raster, it is necessary to build in such delays by the addition of suitable inductors and capacitors. The equivalent circuit diagram of such transmission line or delay line is indicated by the numeral 116 in FIG. 19 wherein it is shown that the plurality of inductors and capacitors compose the line. The embodiment of the display device illustrated in FIGS. 14 to 22 provide these individual inductor and capacitor components in such an arrangement to insure that a pulse will be delayed in its propagation through pattern will be precisely one-thirtieth of a second. The structure of this display device will now be described.

Figure 14:
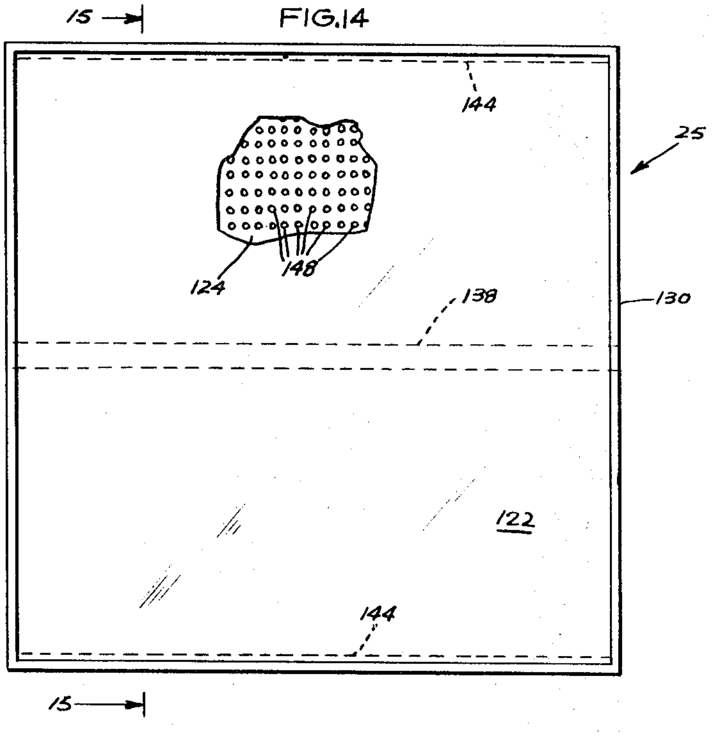
FIG. 14 is a front plan view of another display device made in accordance with the principles of this invention, a portion thereof being broken away for clarity of illustration.
Figure 15:
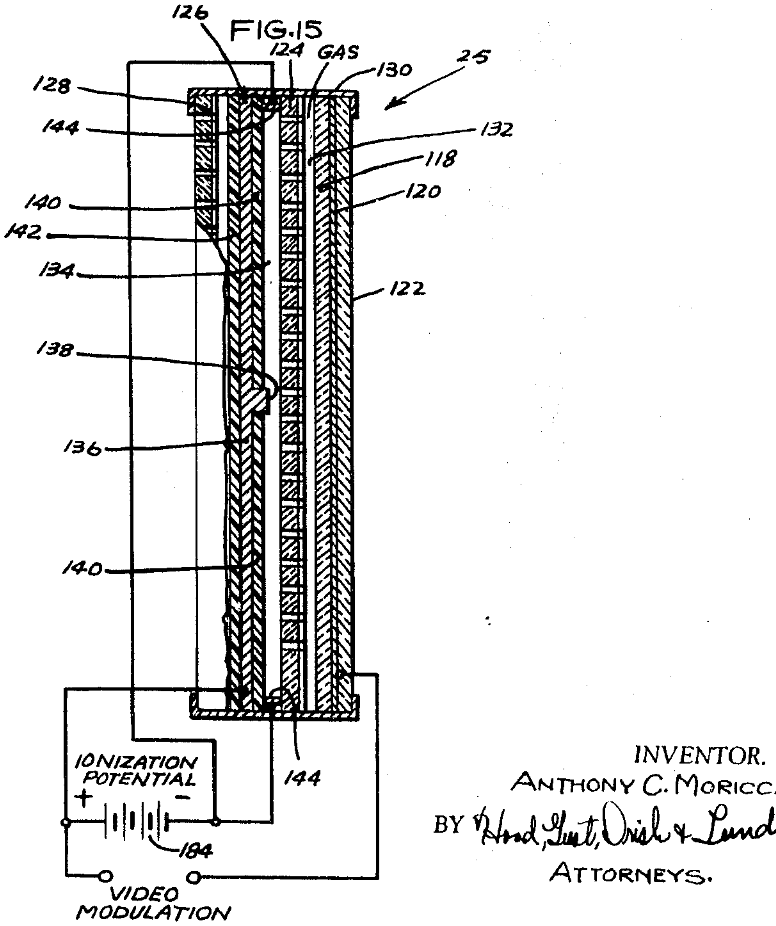
FIG. 15 is a cross section taken substantially along section line 15–15 of FIG. 14.
Figure 16:
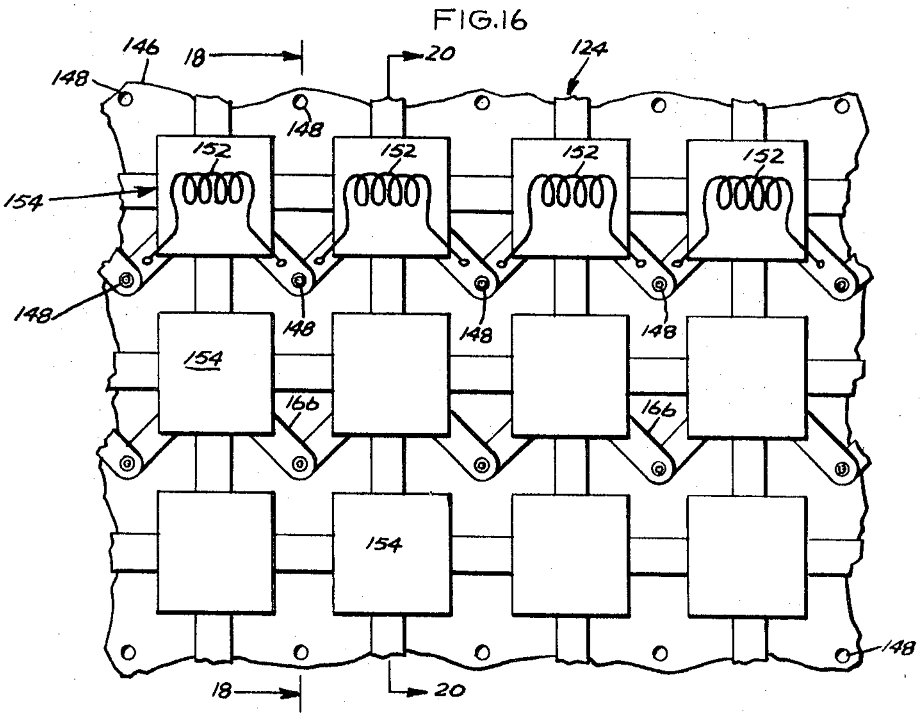
FIG. 16 is a fragmentary front view of the delay line structure of the display device of FIG. 14 with circuit diagrams being superimposed thereon for use in explaining the operation.

Referring more particularly to FIGS. 14, 15 and 16, a generally flat structure presenting a rectangular display area comprises a phosphor screen 118 constructed and formulated substantially like that used in conventional television display tubes backed by a conductive film 120 of metal such as aluminum or silver, these being mounted on a substantially flat transparent faceplate 122 of glass or the like. Spaced to the rear of the phosphor screen 118 and mounted in parallelism therewith is a delay line panel 124, and spaced rearwardly from this and in parallelism therewith is an ionization electrode assembly indicated by the numeral 126. To the rear of this assembly 126 is another delay-line panel 128 constructed to have electrical characteristics identical to the panel 124. All of these panels are fixedly secured in these relative positions by means of a peripheral frame 130 of metal or the like which also provides a hermetic seal around the peripheries of these panels. There is thus defined two gastight compartments, one of these being indicated by the numeral 132 between the panel 124 and phosphor screen 118 and the other being identified by numeral 134 and located between the panel 124 and the electrode assembly 1. Luminescing gas as previously described is contained within these two compartments 132 and 134 at a suitable subatmospheric pressure.

The electrode assembly 126 will be first described. It includes a self-supporting flat metal plate 136 having a straight barlike embossment 138 extending across one surface from edge to edge. Also, this embossment is located substantially midway between the upper and lower edges of the plate 136 as shown in FIG. 15. A sheet 140 of insulation which may be in the form of plastic, glass or ceramic, is adhered to the same surface of the plate 136 as the embossment 138 to cover all but the protruding portion of the embossment 138. Hereinafter, this embossment 138 may be referred to as one of the ionization electrodes in the assembly 126.

On the back side of the plate 136 is a sheet of insulation 142. Immediately adjacent to the right-hand face of the electrode assembly 126, as shown in FIG. 15, are mounted two barlike discharge electrodes 144, these being disposed adjacent to the opposite outer edges of the plate 136 in parallelism with the ionization electrode 138 as shown. These electrodes 144 are insulated from the retaining frame 130 if the latter is made of metal.

Figures 17, 18:
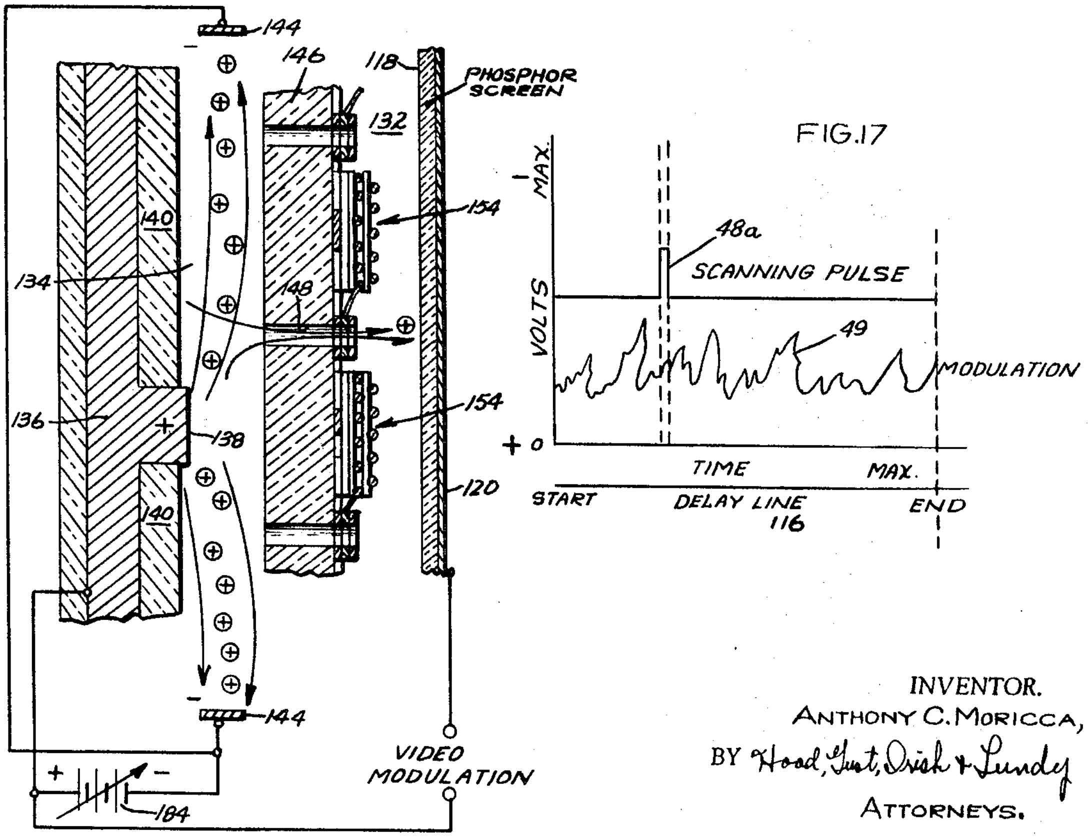
FIG. 17 is a graph used in explaining the operation of the display device of FIG. 14.
FIG. 18 is a fragmentary sectional view taken substantially along section line 18–18 of FIG. 16.
Figure 19:
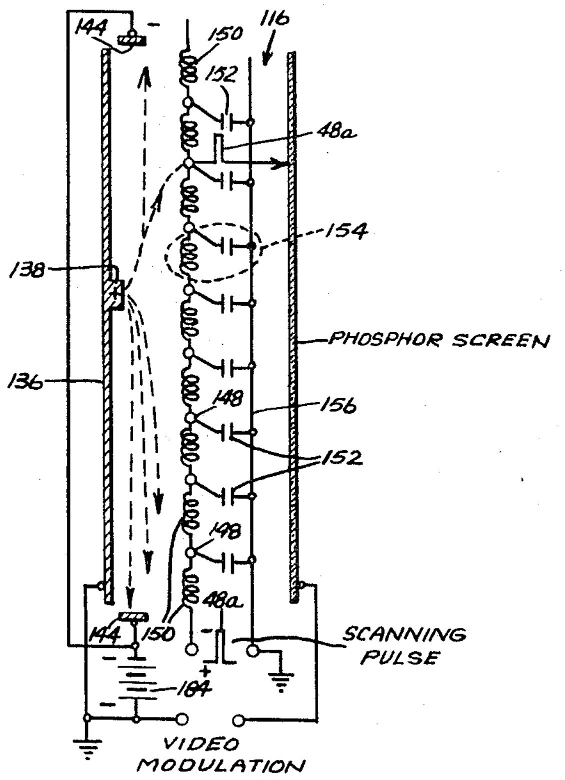
FIG. 19 is an equivalent circuit diagram of the arrangement of FIG. 18 and is used in explaining the operation thereof.

The delay-line panel 124 is shown in different degrees of detail in FIGS. 16 to 22. Referring more particularly to FIGS. 15, 16, 18 and 20, the panel 124 includes a plate 146 of insulation such as self-supporting glass or plastic which preferably is opaque. A multiplicity of tiny apertures 148 spaced apart in horizontal rows and vertical columns are formed in this plate 146 and provide communication between the two gas compartments 132 and 134. Mounted on the front face (right-hand side as viewed in FIG. 15) of the plate 146 is fabricated delay line composed of inductors and capacitors of minute size and preferably formed by the usual printed or integrated circuit techniques. As shown in FIG. 19, the delay line 116 is composed of a series of inductors 150 and capacitors 152 there being one inductor 150 and one capacitor 152 for each aperture 148. The combination of one inductor 150 and capacitor 152 will be referred to hereinafter as a delay line section, a typical section being indicated by the numeral 154 in FIGS. 16 and 18. The construction of one of these sections 154 will now be described.

Figure 20:
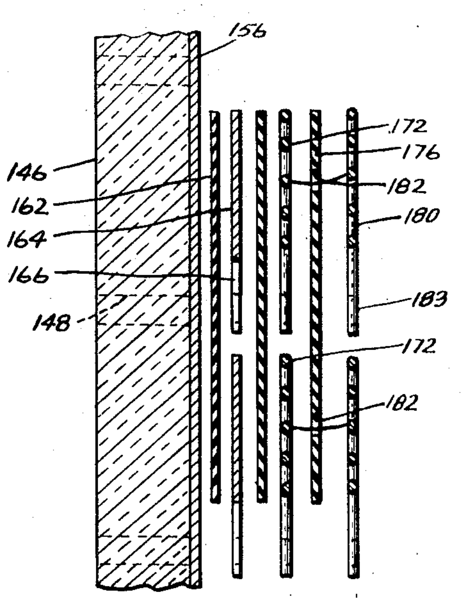
FIG. 20 is a fragmentary cross section of the delay line section of the display device of FIG. 14 with the delay line components being shown in exploded form.
Figure 20A:
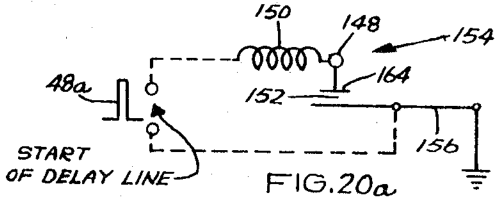
FIG. 20*a* is an equivalent circuit diagram of one delay line section of the structure shown in FIG. 20.
Figure 21:
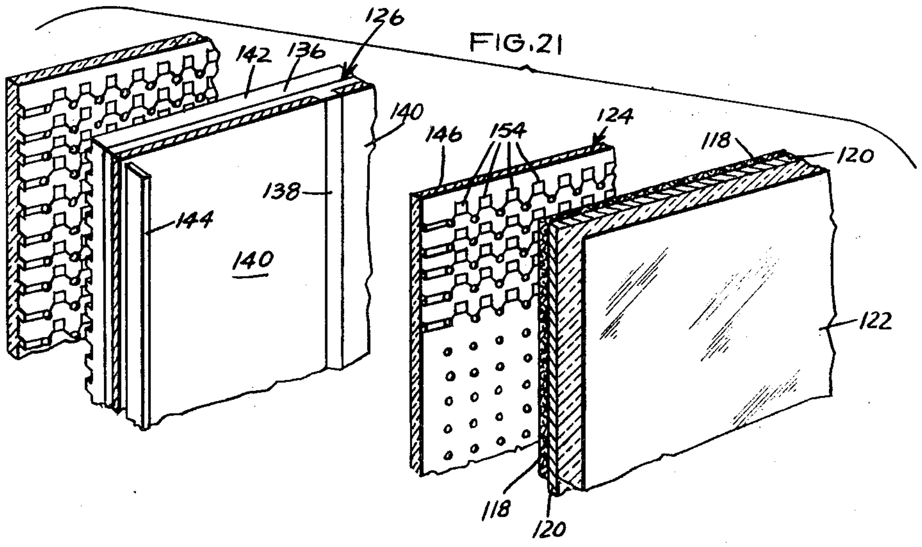
FIG. 21 is an exploded view in perspective of the same delay line section of FIGS. 16 and 20.
Figure 22:
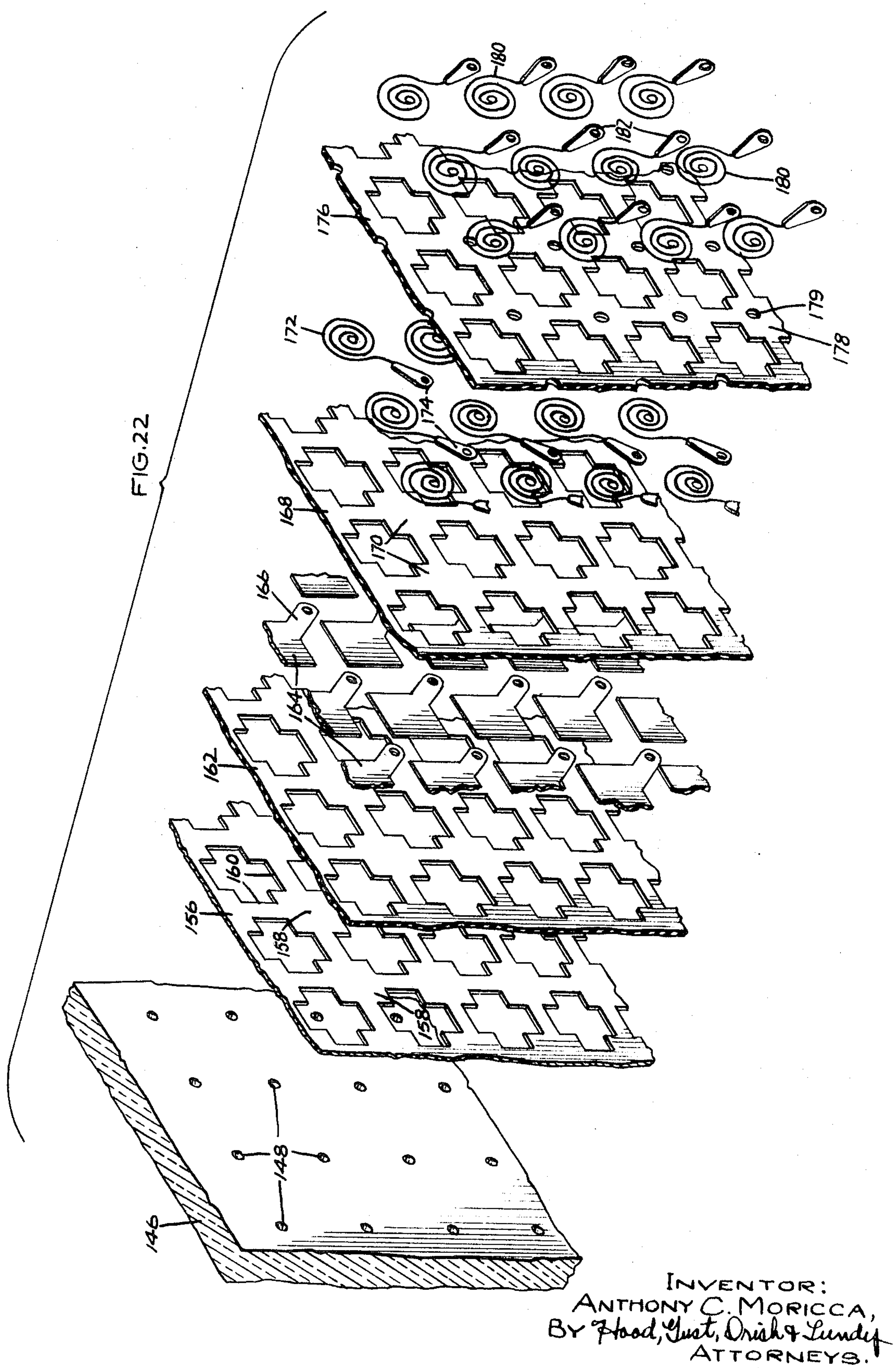
FIG. 22 is a partial exploded view in perspective of the delay line section of FIGS. 16, 18, 19 and 20.

Referring more specifically to FIGS. 18, 20 and 22, one plate of the capacitor 152 is provided by means of a thin metal film 156 of copper or the like on the substrate 146. This film has a configuration as shown more clearly in FIGS. 16 and 22, being composed essentially of individual squares 158 connected together by web portions 160. Superposed on the metallic film 156 and in precise registry therewith is a film 162 of insulation of identical configuration. This insulation may be in any of the forms used in printed and integrated circuits as the dielectric for capacitors. Tantalum oxide is an example. Superposed on the insulating film 162 are a multiplicity of metallic film squares 164 of copper, silver or the like in precise registry with the squares on the films 156 and 162, these squares being indicated by the numeral 158 on the film 156. Each of the squares 164, which constitutes the second plate of the capacitor 152, is provided with a terminal 166 extending diagonally from one corner as shown. The extremity of the terminal portion 166 is perforated so as to register precisely with a respective one of the apertures 148.

Superposed on the capacitor plate 164 in precise registry therewith is a film 168 of insulation which may be of identical configuration as the film 162. On each of the squares 170 of the film 168 is adhered one-half 172 of a spirally wound inductor having a terminal 174 extending diagonally therefrom in registry with a respective one of the apertures 148. This terminal 148 is connected to a respective one of the terminal portions 166. Another layer or film of insulation 176 is superposed on the inductor halves 172 in registry therewith, but in this film, each of the squares 178 is provided with a central opening 179. On each of the squares 178 is adhered another half of a spirally wound inductor 180 having a terminal 182 disposed in registry with an aperture 148. A connection is made through each opening 179 to the centers of two of the superposed inductor halves 172 and 180 to complete the single inductor as indicated by the numeral 150 in FIG. 19. It should be noted that the terminals 174 and 182 are adhered in registry with horizontally adjacent apertures 148, respectively. This is schematically illustrated also in FIG. 16. One horizontal row of apertures 148 delineates one horizontal line in a television raster and also geometrically defines one length portion of the delay line 116 (FIG. 19). Thus, the delay-line panel 124 may be characterized as having applied to the front face thereof a series of horizontally disposed and spaced-apart delay lines which are connected in series as will be later explained.

In a typical display panel 124 which is 18 inches by 24 inches in area, the holes 148 are of 10-mil diameter and spaced apart orthogonally 43.5 mils, there being 39.7 mils to 1 millimeter. The inductor sections 172 and 180 are spirally wound printed or integrated circuits having an inductance each of 1.2 microhenries. Otherwise, each section of the delay line corresponding to a horizontal line in the scanning raster is designed to provide a delay of a scanning pulse injected at one end a time equal to the normal time for scanning one line before the pulse reaches the opposite end. The precise design requirements will vary depending on the sizes and spacings of the apertures 148, particular gases used, materials used in forming the capacitors and inductors, and the like. In the embodiment briefly described hereinabove, each of the squares in a delay-line section 154 is 1 millimeter from edge to edge, tantalum oxide being a preferred insulator between the capacitor plates and inductor sections. The metallic films in the line sections 154 may be deposited by means of techniques conventionally employed in fabricating miniaturized printed or integrated circuits. Each horizontal line section of the delay-line 116 (FIG. 19) just described is electrically connected to the immediately adjacent horizontal line by means of a retrace section composed of inductors and capacitors 150, 152 identical to those just described. These inductors and capacitors are arranged in delay-line sections 154 and are applied in parallel horizontal line configuration exactly like that shown and described hereinabove on the back side of the sheet 142 of insulation carried by the metal plate 136. There are an equal number of these lines of delay sections 154 on the back side as for the horizontal lines on the front of the panel 124, in a practical arrangement there being 525 horizontal lines of delay sections 154 on both the front side and rear sides of the panel 146 and sheet 142 respectively. These lines on the front and rear sides of the two panels are connected together in series by means of suitable mutually insulated edge connections on the panels. The number of delay sections 154 on the back side of insulation sheet 142 are fewer than those on the front side of the panel 124 so as to provide a delay time one-ninth that of the delay-line section in one horizontal line on the front side of the panel 124. This provides for fast retrace of the scanning pulse. By comparison, the delay-line construction of this display device is the electrical equivalent of the transmission line of the first embodiment and is geometrically arranged the same so as to provide a scanning pattern identical to a conventional television raster. The arrangement of FIGS. 14 to 22 is such that the transmission line has inductors and capacitors built in so as to provide the necessary delay of a scanning pulse.

In order to terminate the delay line on the panel 124, the terminal portion of the delay line on the panel 124 is terminated in a pure resistance so as to absorb and thereby prevent any reflection of the scanning pulse.

A typical operating circuit is shown in FIG. 15 and includes a battery 184 having its positive terminal connected to the metal plate 136 and its negative terminal to the two ionizing electrodes 144. Video modulation as supplied by the video amplifier 186 (FIG. 13*a*) is applied to the two plates 136 and 120.

The potential 184 is adjusted to a value at which neon, argon or the like gas in chamber 134 is ionized. This ionization occurs by reason of the discharge between the ionizing electrode 138 and the two outer electrodes 144. It is important that the gas throughout the chamber 134 be ionized, this chamber being flat and coextensive in area with the panel 124.

An applied scanning pulse 48*a* (FIG. 17) of voltage will propagate along the delay-line 116 (FIG. 19) and will appear successively at each aperture 148. If this pulse 48*a* is of sufficient negative amplitude, it will attract ions from the compartment 134 (FIGS. 15, 18) through the pulsed aperture 148. Video modulation on the phosphor screen 118 which is also negative going will cause luminescence of a spot on the phosphor screen 118 opposite the aperture 148 by ion bombardment therefrom. In a conventional cathode-ray tube, electrons are utilized for bombarding the phosphor screen to cause luminescence thereof. In this invention, ions from a pulsed aperture 148 are used for bombarding the phosphor to produce spot luminescence.

The display device is so designed that when the applied video modulation corresponds to black, the modulated potential on the phosphor screen 118 will be insufficient to produce ion bombardment of sufficient magnitude to cause luminescence. On the other hand, for video signals corresponding to maximum brightness, the amplitude of the modulation 118 will be maximum causing ion bombardment of the phosphor at higher energy thereby generating maximum luminescence thereof. For gray scale portions of the image, lower amplitude modulation will be applied to the phosphor 118 thereby resulting in bombardment of the phosphor with fewer ions at lower energy. The phosphor thereby luminesces less in a shade of gray.

At those apertures 148 where no scanning pulse 48*a* appears, none of the ions in the compartment 134 will be drawn therethrough to bombard the phosphor. Thus, the portion of the phosphor screen 118 in registry with that aperture 148 will not be luminesced.

It will now be appreciated that the scanning pulse 48*a* (FIG. 17) serves as a control signal which determines which of the apertures 148 will conduct ions from the compartment 134 for bombarding the phosphor screen 118.

Recapitulating, in the display of an image, he gas in compartment 134 is ionized and a scanning pulse 48*a* like pulse 48 (FIG. 4) is applied to the delay line 116 (FIG. 19). This pulse 48*a* will propagate along the delay line as previously explained in a pattern corresponding to and at the rate of a conventional television raster and at the standard scanning rate. Such scanning pulses 48*a* and the video modulation 49 as applied to the display divide are graphically portrayed in FIG. 17.

Figure 13A:
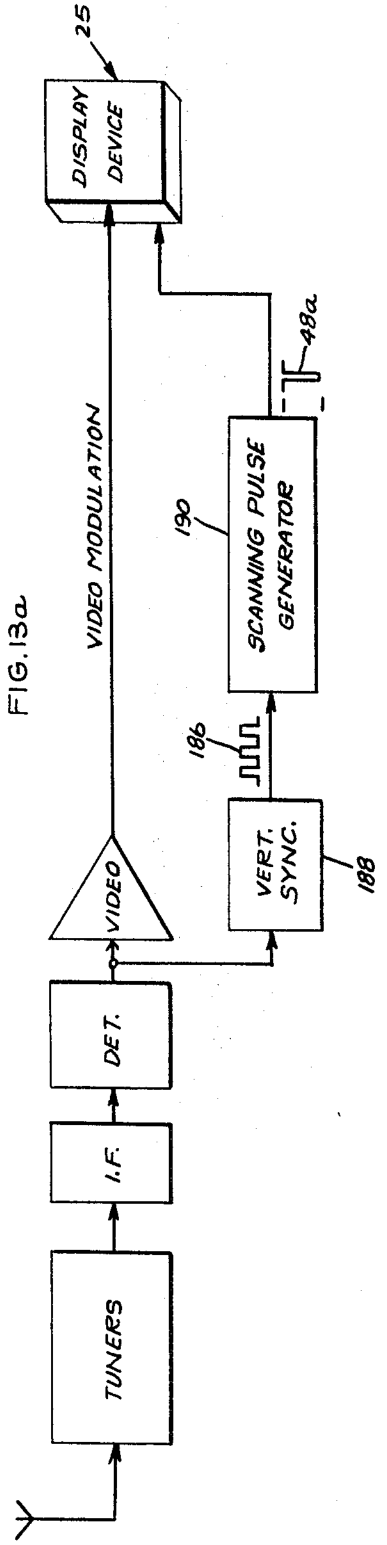
FIGS. 13*a* and 13*b* are, respectively, block and schematic diagrams of another embodiment of this invention.
Figure 13B:
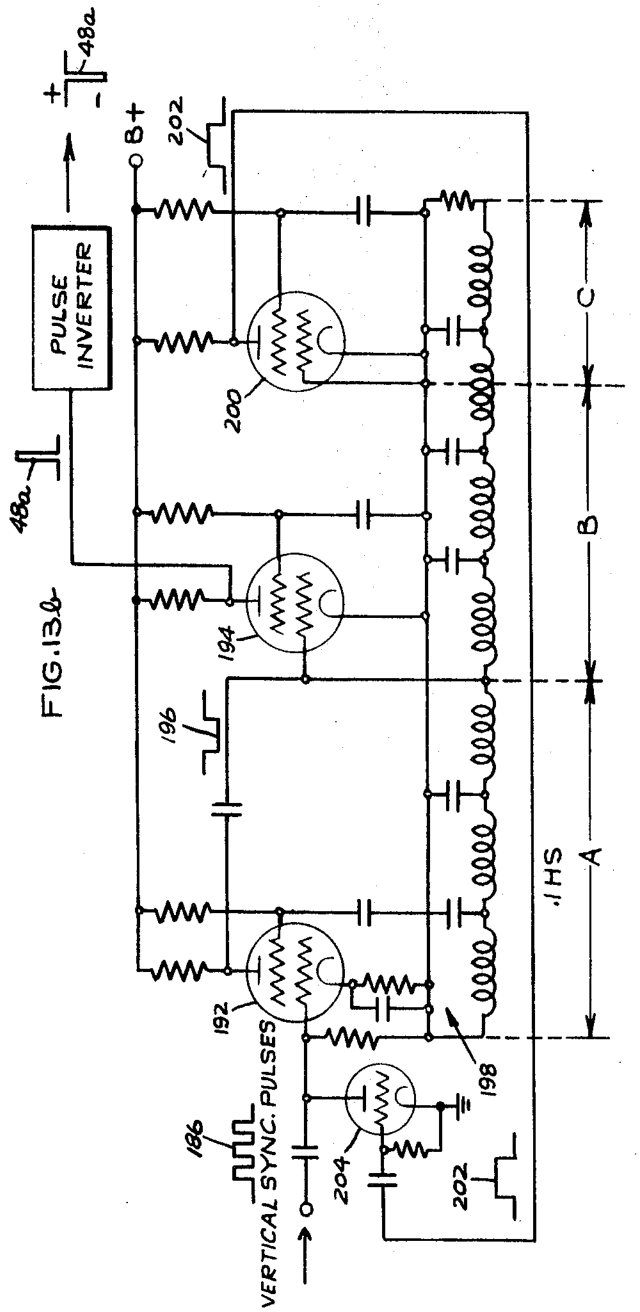

Referring now to FIGS. 13*a* and 13*b*, a suitable circuit for generating the scanning pulse 48*a* in synchronism with the video information applied to the display device will be described. Generally stated, the conventional vertical synchronizing pulses or burst 186 as delivered by the usual vertical synchronizing circuits 188 are fed to a scanning pulse generator 190 which produces one pulse 48*a* every 30th of a second. In accomplishing this, the scanning pulse generator 190 utilizes the leading edge of the first pulse in the sync burst 186 to produce the pulse 48*a*, the rate of repetition of the first leading edge of the successive burst 186 determining the vertical scanning time. This generator 190 includes two tubes 192 and 194 (FIG. 13*b*) in a circuit which may be identical to that of the sharp pulse generator 104 of FIG. 2. With the occurrence of the first pulse 186, or more specifically, the leading edge of the first pulse of the burst 186, a square wave 196 is produced in the anode circuit of the tube 192 and is applied to the control grid of the tube 194. The section of the delay line 198 (FIG. 13*b*) indicated by the letter A results in the application of a signal to the control grid 194 such that a short duration pulse 48*a* is produced in the anode circuit thereof as shown. This pulse 48*a*, is produced in the anode circuit thereof as shown. This pulse 48*a*, as previously explained, is identical to the pulse 48 produced by circuit 104 of FIG. 2 and shown in FIG. 4.

Section B of the delay line 198 which is an extension of the section A of the same characteristic impedance produces sufficient delay of the pulse to include the total time of vertical synchronizing burst 186. This results in the circuit of the tube 200 producing a square wave pulse 202 of a duration equal to the time of the vertical synchronizing burst 186, this pulse 202 serving to render conductive the triode 204 which is biased to be normally nonconductive. All of the pulses in the burst 186 will thereby be shunted to ground with the exception of the leading edge of the first pulse which is utilized to generate, every one-thirtieth of a second, one scanning pulse 48*a*.

As will now be apparent, both of the display devices 24 and 25 of FIGS. 1 and 13*a* respectively, are relatively flat and thin. Dimensionally, these need to be only perhaps one-twentieth as thick as the length of a conventional cathode-ray television tube and further of such dimensions as to be supported on the wall of a room much in the same manner as an ordinary picture.

With respect to the display device 24, changing the frequency of a standing wave on a transmission line is the technique employed for propagating the scanning pulse throughout the display area. With respect to the display device 25, the scanning pulse is controlled in its propagation by means of a delay line. In the use of both devices 24 and 25, a signal containing the video information is effectively added to the scanning pulse 48, 48a for producing localized luminescence of the gas or phosphor as the case may be. It will be apparent that while gaseous and phosphor materials have been disclosed as the luminescing media, other materials may be used without departing from the spirit and scope of this invention. For example, any material which luminesces in response to the application of an electric field may be used, typical examples being electroluminescence phosphor, liquid crystals, and the like.

Basically, instead of using a cathode-ray beam for scanning a phosphor screen, this invention employs an electric wave or pulse of electrical energy which is so controlled in its propagation that it follows the scansion pattern of a television display and at the scanning rate of such display. The pattern is determined by the physical arrangement of a transmission or delay line and the rate of scanning by means of a standing wave of variable frequency on the one hand or by means of delay sections built into a transmission line on the other.

It will be apparent that the circuitry employed in the television receivers depicted by FIGS. 1 and 13*a* contains fewer parts, is simpler in construction and is more economical than that employed in present day conventional receivers. As between the circuits of FIGS. 1 and 13*a* it is obvious that the latter is simpler.

While there have been described above the principles of this invention in connection with specific apparatus, it is to be clearly understood that this description is made only by way of example and not as a limitation to the scope of the invention.

What I claim is:

1. In a television receiver, means for providing a television display having a display area, said display means including means extending over said display area which luminesces in response to an electric field of predetermined magnitude, means for propagating a single pulse of electrical energy at a television-scanning rate through said luminescing means in a pattern corresponding to the scanning pattern of a television display, said propagating means including means for developing an electric field in a localized region of said display area which is in registry with the location of said display area which is in registry with the location of said pulse, said localized region being of a size corresponding to a picture element in said television display, means for applying a video modulated electric field to said luminescing means conjointly with the field of said pulse to provide a localized field at a magnitude which causes luminescence thereof in said localized region in registry with the propagated position of said pulse.

2. The system of claim 1 in which neither field of said pulse nor video modulation is of sufficient magnitude along to excite said luminescing means.

3. The system of claim 2 in which said pulse is a voltage wave and said video modulation applying means includes means which produces said modulated electric field from a modulated voltage wave.

4. The system of claim 3 in which said luminescing means includes a gas, the sum of the voltage waves being greater than the ionization potential of said gas, thereby causing luminescence thereof in localized regions in registry with said voltage wave.

5. The system of claim 4 in which said display means includes a transmission line having two spaced conductors, said transmission line extending through said luminescing means in the pattern of a television display scanning pattern, said gas being in the space between said conductors.

6. The system of claim 5 in which said transmission line has a finite delay time, and said pulse having a duration substantially shorter than said delay time and corresponding to the size of said localized region.

7. The system of claim 5 in which said propagating means includes a sweep signal generator supplying a variable sweep frequency signal to said transmission line at frequencies which produce a standing wave thereon, means for varying the frequency of said sweep signal generator progressively from a lower to an upper frequency limit, whereby a standing wave node is caused to move progressively on said transmission line from one end portion to the opposite end portion thereof, said applying means including means for modulating said standing wave with video information to increase the voltage of a discrete incremental portion of said standing wave to a value which causes ionization of said gas.

8. The system of claim 7 in which said transmission line has an electrical length between said end portions thereof of a quarter-wave length at said lower frequency limit and a half-wave length at said upper frequency limit.

9. The system of claim 8 in which one of said conductors is arranged in a plane in horizontal spaced-apart lines corresponding to a television raster.

10. The system of claim 8 in which said two conductors are wirelike and arranged in pairs in a plane in horizontal spaced apart lines corresponding to a television raster.

11. The system of claim 10 in which said conductors are mounted in helical fashion on an insulating support having front and rear surfaces, one of said surfaces coinciding with said plane, said display means further includes an envelope providing a sealed gas compartment in communication with said front side, and means terminating said transmission line, said terminating means including a second insulating support like the one first mentioned and two conductors thereon like the ones first mentioned, the distal end of the transmission line formed by said second conductors being terminated with an open circuit.

12. The system of claim 7 in which said conductors are helically arranged with the turns thereof on one side being in a pattern corresponding to a television raster composed of vertically spaced horizontal lines, the conductors on said one side constituting the display portion of the transmission line while the remaining portions of said conductors constitute the retrace portion thereof, said frequency-varying means including means varying the frequency of said sweep generator repetitively and in sequence at two different rates, the first rate being linear and for a period of one horizontal trace line of said raster and the second rate being faster and for a period of one horizontal retrace line of said raster.

13. The system of claim 12 including means for producing a train of short duration pulses in synchronism with said sweep frequency, and means for superimposing one each of said short duration pulses on each node of said sweep signal, whereby the combined voltage of the node and short duration pulse exceeds the maximum voltage of said node, the duration of each short duration pulse corresponding to the size of a picture element in a displayed television image.

14. The system of claim 12 in which said frequency-varying means includes a time constant circuit having a charging capacitor, means charging said capacitor sequentially at said first and second rates, and means coupled to said capacitor for discharging the same once for each television frame time.

15. The system of claim 14 including means generating two trains of pulses in synchronism, the first train being of an amplitude greater than that of the second train, the time duration of the first train being shorted than that of the second train, the differences in amplitude and duration being at the same ratio, and means applying said two pulse trains to said charging capacitor.

16. The method of reproducing a television image comprising the steps of propagating a single pulse of electrical energy at a television-scanning rate through a luminescing means in a pattern corresponding to the scanning pattern of a television display, said luminescing means being coextensive with the display area of an image display device, utilizing said pulse to produce an electric field in a localized region of said display area which propagates in synchronism with said pulse, said localized region being of a size corresponding to a picture element in a television display, applying a video modulated electric field to said luminescing means conjointly with the field of said pulse to provide a conjoint field of a magnitude which causes luminescence thereof in said localized region in registry with the propagated position of said pulse.

17. The method of claim 16 in which said pulse is a voltage pulse and said luminescing means is a gas, said video-modulated field being generated by a video-modulated potential being insufficient to cause luminescence of said gas, however, the sum thereof causing luminescence in said localized region.

18. The method of claim 17 in which said voltage pulse is propagated through said pattern in a finite period of time said pulse being of a duration substantially shorted than said finite period of time.

19. The method of claim 17 in which said pulse is propagated by means of a standing wave, and applying said video modulated potential to said standing wave to increase the voltage of said pulse to a valve which causes ionization of said gas.

20. The method of claim 17 including arranging a transmission line according to said pattern, said pattern being a raster of active horizontal lines vertically spaced connected together by retrace lines, propagating said pulse at a first predetermined velocity along said active lines and at a second predetermined velocity faster than the first along said retrace lines, providing said transmission line with a finite delay time, propagating said pulse by means of a standing wave on said transmission line, said voltage pulse being superimposed on the node of said standing wave, varying the frequency of said standing wave in a direction and at a rate that moves the node thereof according to the propagating velocities as aforesaid, and applying said video modulated potential to said standing wave to increase the voltage of said pulse to a value which causes ionization of said gas.

21. The method of claim 17 including propagating said pulse by means of a standing wave, said voltage pulse being added to said standing wave, controlling the magnitude of said pulse to exceed that of the standing wave and the duration thereof to be substantially shorter than said delay time, said pulse duration further corresponding to the size of an elemental portion of a television image.

22. The system of claim 4 in which said display means includes a delay line having a structural arrangement corresponding to a television display scanning patter, said delay line having a delay time equal to the time for scanning said pulse once over said display area, said propagating means including means for applying said pulse in the form of a voltage pulse to one end of said delay line, the duration of said pulse corresponding to the size of said picture element and being substantially shorter than said delay time.

23. The system of claim 22 in which said display means includes a phosphor screen and a volume of said gas, means for maintaining the gas in said volume in an ionized state, control means for separating normally the ionized gas in said volume from said phosphor screen, said control means including said delay line and means for defining and directing a multiplicity of ion currents spaced in a plane parallel to the plane of said phosphor screen from said volume to said phosphor screen, said video modulation applying means being coupled to said phosphor screen whereby negative potential modulation applied thereto will result in impact of those ion currents thereagainst which are in registry with said voltage pulse on said delay line, said voltage pulse also being negative with respect to the charge of the ions of said ion currents.

24. The system of claim 23 in which said control means includes a planar member having a multiplicity of apertures therethrough, said delay line being mounted on said planar member and having terminal portions in registry with said apertures, respectively, whereby said voltage pulse occurring at one of said terminal portions attracts ions through the respective aperture the ions then being attracted toward said phosphor screen by the video modulation thereon.

UNITED STATES PATENT OFFICE

CERTIFICATE OF CORRECTION

Patent No. 3,590,154 Dated June 29, 1971

Inventor(s) Anthony C. Moricca

It is certified that error appears in the above-identified patent and that said Letters Patent are hereby corrected as shown below:

SPECIFICATION

Column 2, line 23 (Abstract), "propogated" should be ---propagates---
Column 6, line 63, "4" should be ---48---
Column 8, line 73, "tubes" should be ---tube---
Column 9, line 60, after "zero" insert ---(0)---
Column 10, line 18, "advance" should be ---advances---
Column 11, line 54, "gastight" should be ---gas-tight---
Column 11, line 58, "1" should be ---126---
Column 12, line 15, after "is" insert ---a---
Column 14, line 23, "he" should be ---the---
Column 14, lines 52-53, delete "This pulse 48a is produced in the anode circuit thereof as shown."
Column 15, line 6, after "both" insert ---of the---

CLAIMS

Claim 1, Column 15, lines 46-47, delete "display area which is in registry with the location of said"
Claim 2, Column 15, line 55, "along" should be ---alone---
Claim 15, Column 16, line 62, "shorted" should be ---shorter---
Claim 17, Column 17, lines 8-9, after "potential" insert ---, individually the voltage pulse and video modulated potential---
Claim 18, Column 17, line 12, insert after "time" ---,---
Claim 18, Column 17, line 13, "shorted" should be ---shorter---
Claim 20, Column 17, line 18, "valve" should be ---value---
Claim 22, Column 18, line 7, "patter" should be ---pattern---
Claim 24, Column 18, line 34, after "aperture" insert ---,---

Signed and sealed this 7th day of March 1972.

(SEAL)
Attest:

EDWARD M. FLETCHER, JR.
Attesting Officer

ROBERT GOTTSCHALK
Commissioner of Patents